US012724367B2

(12) United States Patent
Toratani et al.

(10) Patent No.: US 12,724,367 B2
(45) Date of Patent: Sep. 1, 2026

(54) FIXING DEVICE

(71) Applicant: CANON KABUSHIKI KAISHA, Tokyo (JP)

(72) Inventors: Yasuharu Toratani, Chiba (JP); Suguru Takeuchi, Chiba (JP); Hiroshi Miyamoto, Saitama (JP); Kengo Koyama, Chiba (JP); Akiyoshi Shinagawa, Saitama (JP); Kiyonori Sotome, Ibaraki (JP); Ayano Saito, Chiba (JP); Masaki Suda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/069,043

(22) Filed: Mar. 3, 2025

(65) Prior Publication Data

US 2025/0284232 A1 Sep. 11, 2025

(30) Foreign Application Priority Data

Mar. 11, 2024 (JP) ................................ 2024-037541

(51) Int. Cl.
*G03G 15/20* (2006.01)

(52) U.S. Cl.
CPC ..... *G03G 15/2053* (2013.01); *G03G 15/2064* (2013.01); *G03G 2215/2038* (2013.01)

(58) Field of Classification Search
CPC ........... G03G 15/2053; G03G 15/2064; G03G 2215/2038; G03G 15/2028
See application file for complete search history.

(56) References Cited

U.S. PATENT DOCUMENTS

| | | | | |
|---|---|---|---|---|
| 9,727,008 | B2 * | 8/2017 | Kawata | G03G 15/2017 |
| 12,044,991 | B2 | 7/2024 | Takeuchi et al. | |
| 12,298,690 | B2 | 5/2025 | Takeuchi et al. | |
| 2014/0341621 | A1 * | 11/2014 | Omori | G03G 15/206 399/329 |
| 2016/0223964 | A1 * | 8/2016 | Ikebuchi | G03G 15/2064 |
| 2017/0102655 | A1 | 4/2017 | Yamagishi | |
| 2021/0302882 | A1 * | 9/2021 | Saito | G03G 15/2064 |
| 2023/0273550 | A1 | 8/2023 | Shinagawa | |

FOREIGN PATENT DOCUMENTS

JP 2015114394 A 6/2015

OTHER PUBLICATIONS

Extended European Search Report dated Sep. 29, 2025 in counterpart European Patent Appln. No. 25161754.4.

* cited by examiner

*Primary Examiner* — Jessica L Eley
(74) *Attorney, Agent, or Firm* — Venable LLP

(57) ABSTRACT

A fixing device includes an endless belt, a rotating member, a pad disposed inside the belt so as to nip the belt between itself and the rotating member and form a nip, and a sliding member disposed between the pad and the belt. The pad includes a curved portion which is curved so as to directly contact the belt in a downstream side of the nip in a conveyance direction of the recording material. The curved portion includes a first portion positioned in a downstream side, in the conveyance direction, of a passing through region where a recording material with a maximum size passes through the nip and a second portion positioned in a downstream side of a non-passing through region outside of the passing through region in a widthwise direction. A radius of curvature of the second portion is larger than a radius of curvature of the first portion.

17 Claims, 11 Drawing Sheets

| STRUCTURE | BELT DURABILITY EVALUATION TEST | | | SHEET SEPARATION PERFORMANCE EVALUATION TEST |
|---|---|---|---|---|
| | JUDGMENT | MEMBER DURABLE SHEETS | BREAKAGE MODE | |
| EMBODIMENT 1 | ○ | 1000 MIL SHEETS | CRACK OCCURRENCE ON CENTER OF BELT | ○ |
| COMPARATIVE EXAMPLE 1 | × | 300 MIL SHEETS | CRACK OCCURRENCE ON END OF BELT | ○ |
| EMBODIMENT 2 | ○ | 800 MIL SHEETS | CRACK OCCURRENCE ON CENTER OF BELT | ○ |
| COMPARATIVE EXAMPLE 1 | × | 120 MIL SHEETS | CRACK OCCURRENCE ON END OF BELT | ○ |

FIG. 11

FIXING DEVICE

FIELD OF THE INVENTION AND RELATED ART

The present invention relates to a fixing device which fixes a toner image carried on a recording material to the recording material.

As a fixing device, a configuration in which a nip portion is formed by a belt and a rotating member such as a roller to heat and press the recording material passing through the nip portion has been conventionally known. In Japanese Patent Application Laid-Open No. 2015-114394, it is disclosed that a configuration in which a pad member, which is disposed inside a belt so as to be opposing to a rotating member across the belt and forms the nip portion described above, is provided. And a downstream end portion in a conveyance direction of the recording material in the nip portion of the pad member is a curved surface, and by curving the belt with a curvature of this curved surface, the recording material passed through the nip portion is separated from the belt.

SUMMARY OF THE INVENTION

According to an aspect of the present invention, there is provided a fixing device for fixing a toner image carried on a recording material to the recording material, the fixing device comprising: an endless and rotatable belt; a rotating member configured to rotate in contact with an outer peripheral surface of the belt; a pad member disposed inside the belt so as to nip the belt between itself and the rotating member and form a nip portion for nipping and conveying the recording material between the belt and the rotating member; a sliding member disposed between the pad member and the belt, and configured to contact and slide together with an inner peripheral surface of the belt in the nip portion; and a heating roller disposed inside the belt and configured to heat the belt, wherein the pad member includes a curved portion which is curved so as to directly contact the belt in a downstream side of the nip portion with respect to a conveyance direction of the recording material and curves the belt so as to separate the recording material passed through the nip portion from the belt, and wherein the curved portion includes a first portion positioned in a downstream side, with respect to the conveyance direction, of a passing through region where a recording material with a maximum size passes through the nip portion and a second portion positioned in a downstream side, with respect to the conveyance direction, of a non-passing through region outside of the passing through region with respect to a widthwise direction, of the recording material, crossing the conveyance direction, and wherein a radius of curvature of the second portion is larger than a radius of curvature of the first portion.

Further features of the present invention will become apparent from the following description of exemplary embodiments with reference to the attached drawings.

Figure 2:
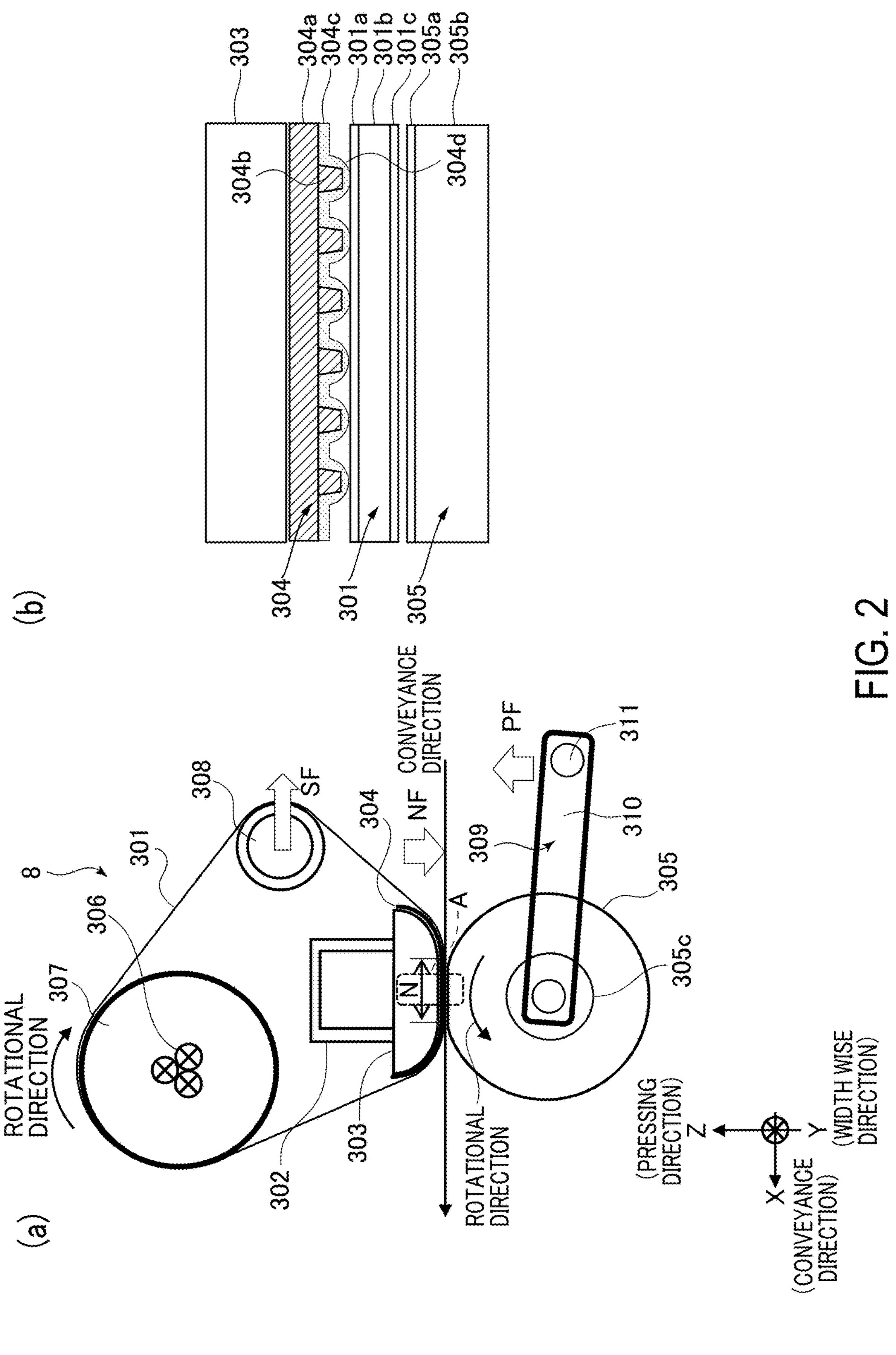

Part (a) of FIG. 2 is a cross-sectional view of an outline configuration of a fixing device according to the Embodiment 1, and part (b) of FIG. 2 is a schematic view illustrating an enlarged portion A in part (a).

Figure 3:
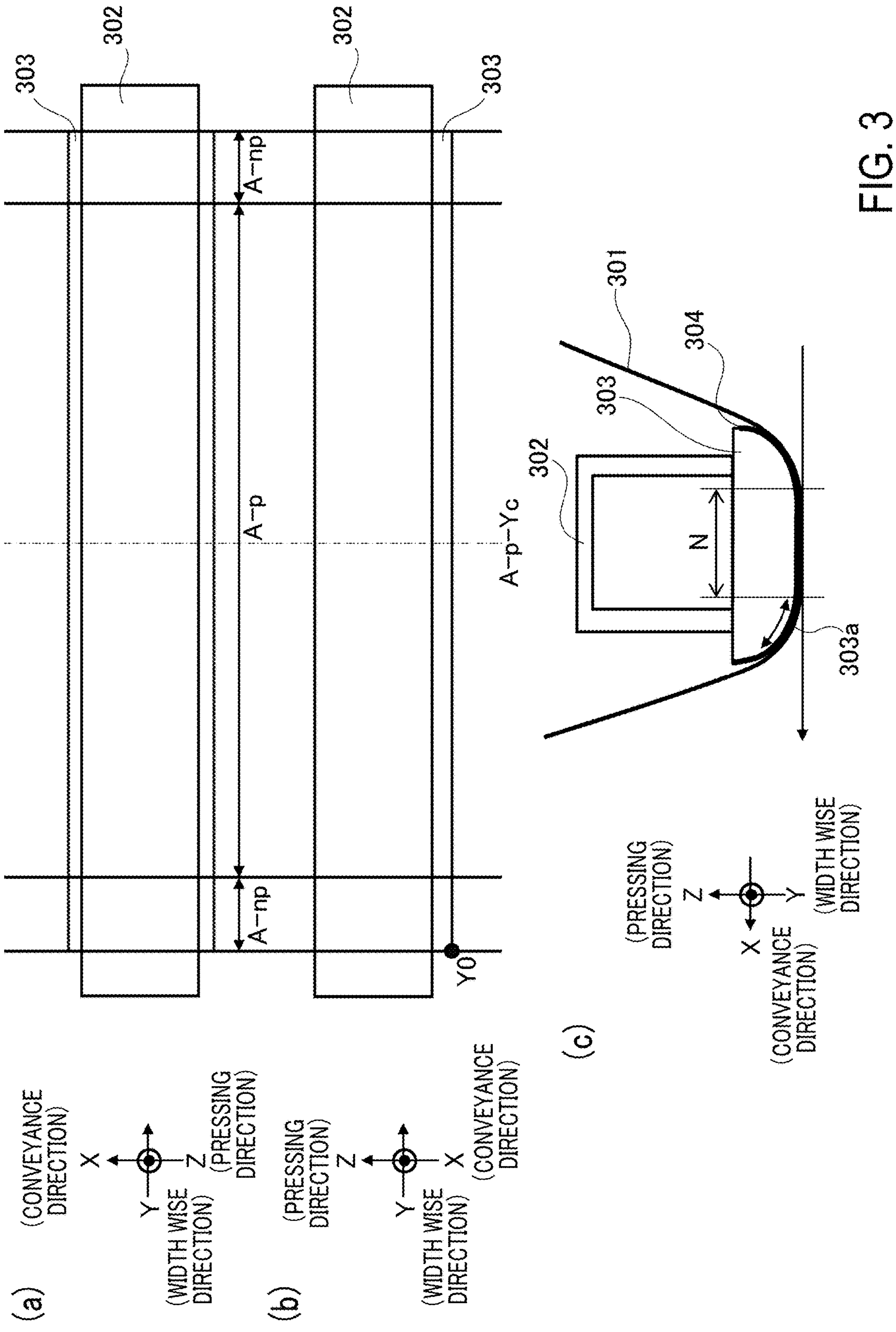

Part (a) of FIG. 3 is a schematic view of a stay and a pad according to the Embodiment 1 as seen from above in a pressing direction, part (b) of FIG. 3 is a cross-sectional view of an outline configuration of the stay and the pad, which are cut along a widthwise direction thereof and seen from a downstream side in a conveyance direction, and part (c) of FIG. 3 is a cross-sectional view of an outline configuration of a belt, the stay and the pad, which are cut at a central position of the stay in a longitudinal direction.

Figure 4:
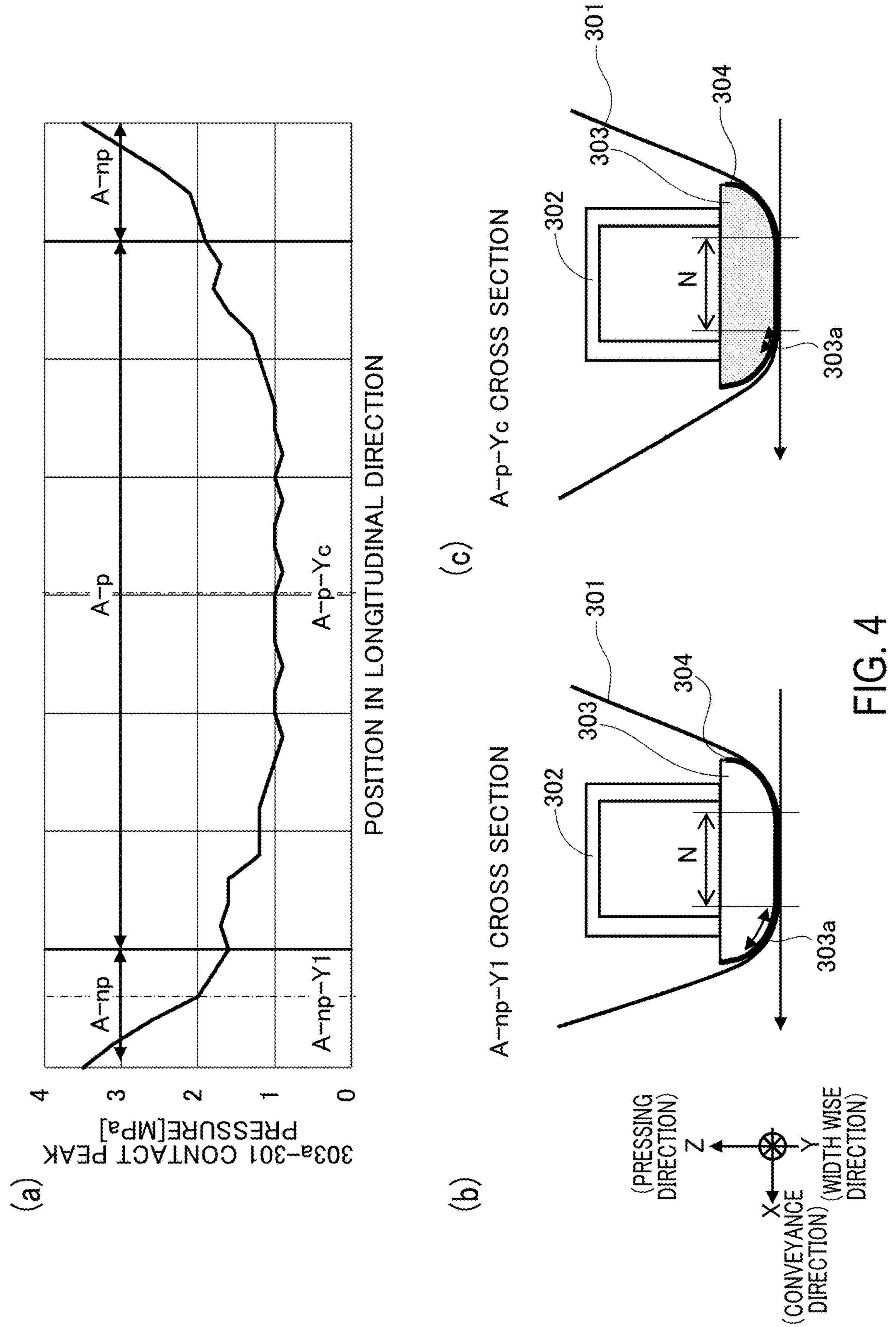

Part (a) of FIG. 4 is a graph showing a distribution in the longitudinal directional of peak pressure, which is generated between a curved portion of the pad and the belt according to the Embodiment 1, part (b) of FIG. 4 is a cross-sectional view of the outline configuration of the belt, the stay and the pad at a position of A-np-Y1 in part (a), and part (c) of FIG. 4 is a cross-sectional view of the outline configuration of the belt, the stay and the pad at a position of A-p-Yc in part (a).

Figure 5:
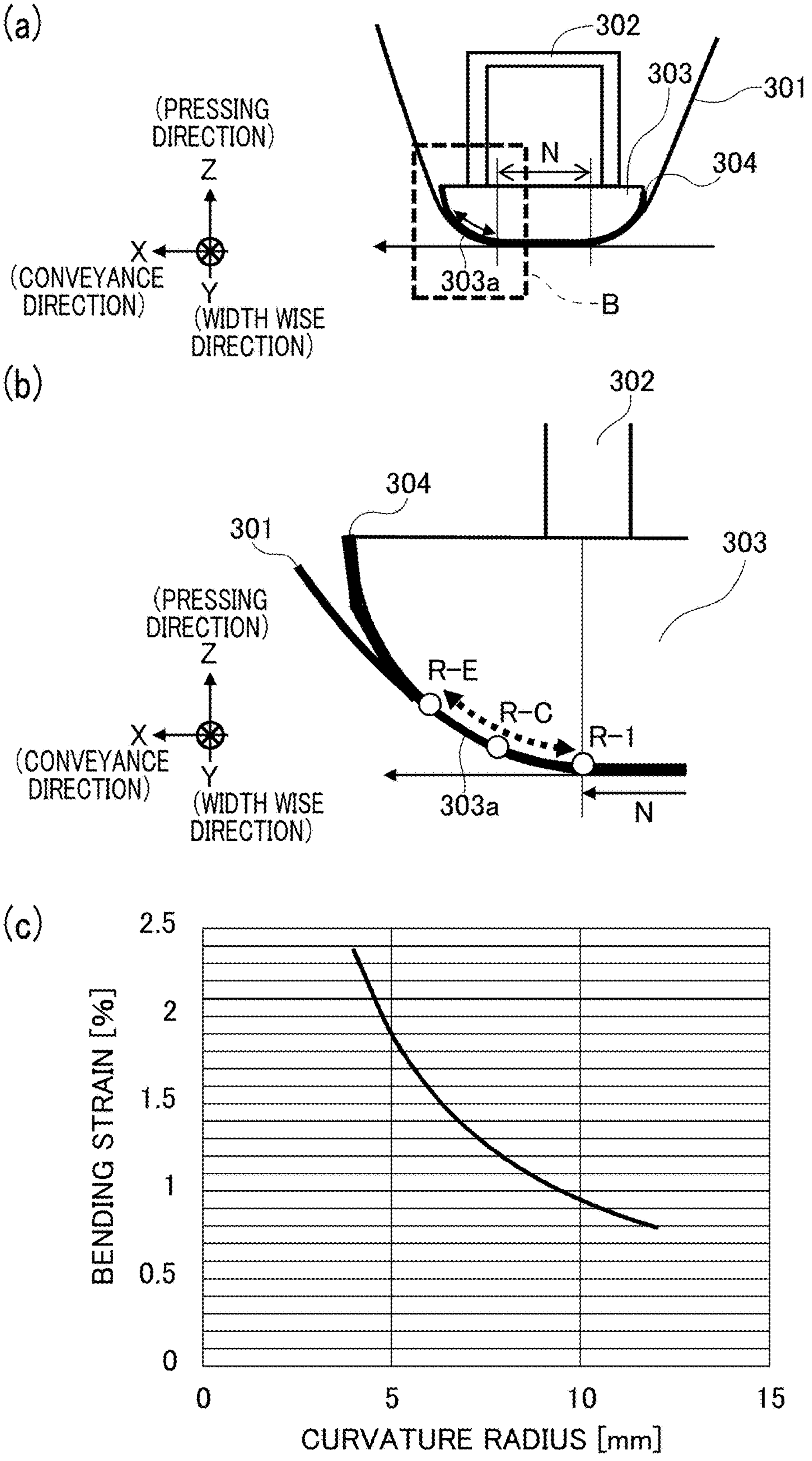

Part (a) of FIG. 5 is a cross-sectional view of the outline configuration of the belt, the stay and the pad according to the Embodiment 1, part (b) of FIG. 5 is an enlarged view of a portion B in part (a), and part (c) of FIG. 5 is a graph showing relationship between a radius of curvature of the curved portion of the stay and a bending strain.

Figure 6:
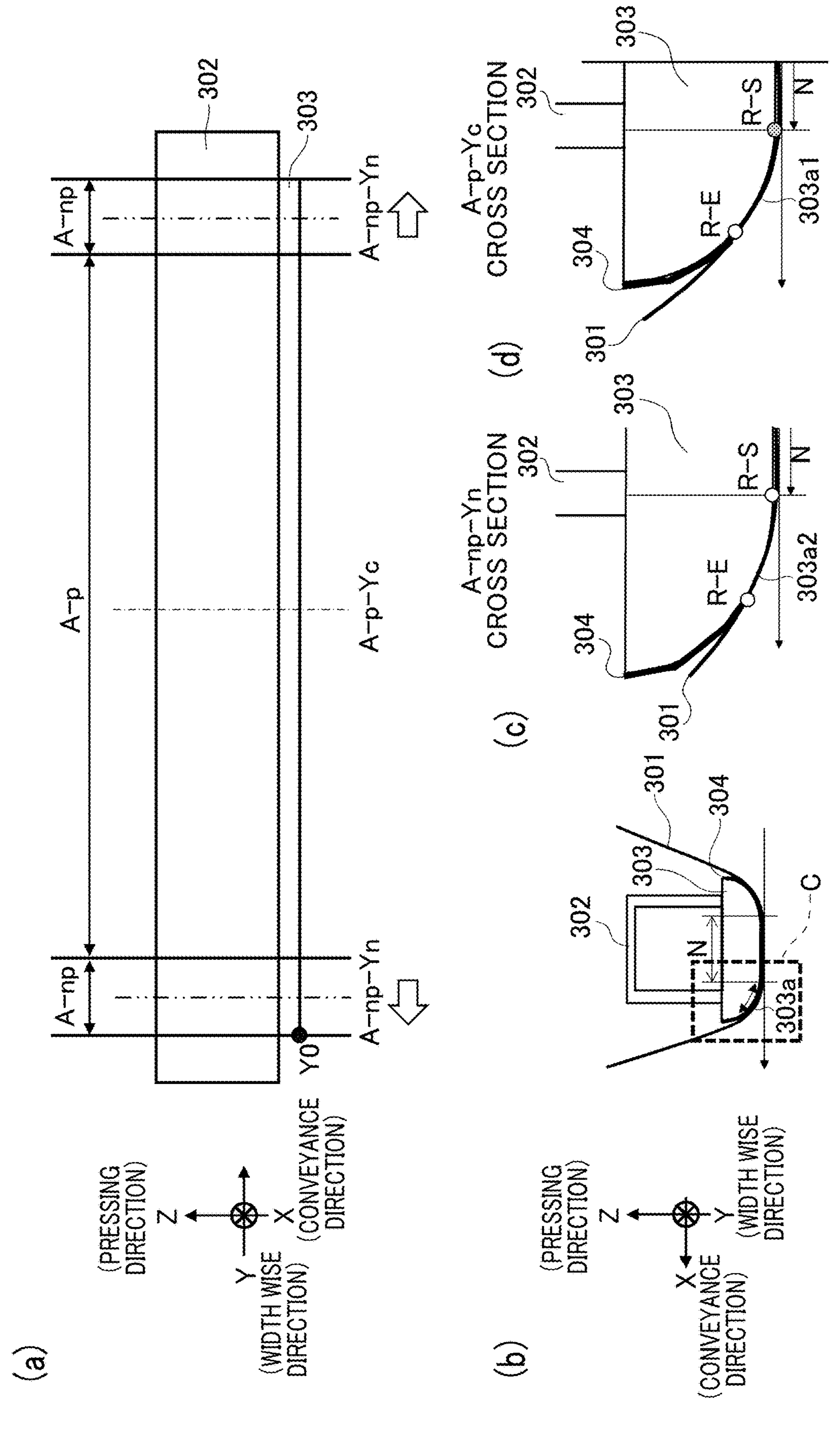

Part (a) of FIG. 6 is a cross-sectional view of the outline configuration of the stay and the pad according to the Embodiment 1, which are cut along the widthwise direction thereof and seen from the downstream side in the conveyance direction, part (b) of FIG. 6 is a cross-sectional view of the outline configuration of the belt, the stay and the pad according to the Embodiment 1, part (c) of FIG. 6 is an enlarged view of a portion C in part (b) at a position of A-np-Yn in part (a), and part (d) of FIG. 6 is an enlarged view of the portion C in part (b) at a position of A-p-Yc in part (a).

Figure 7:
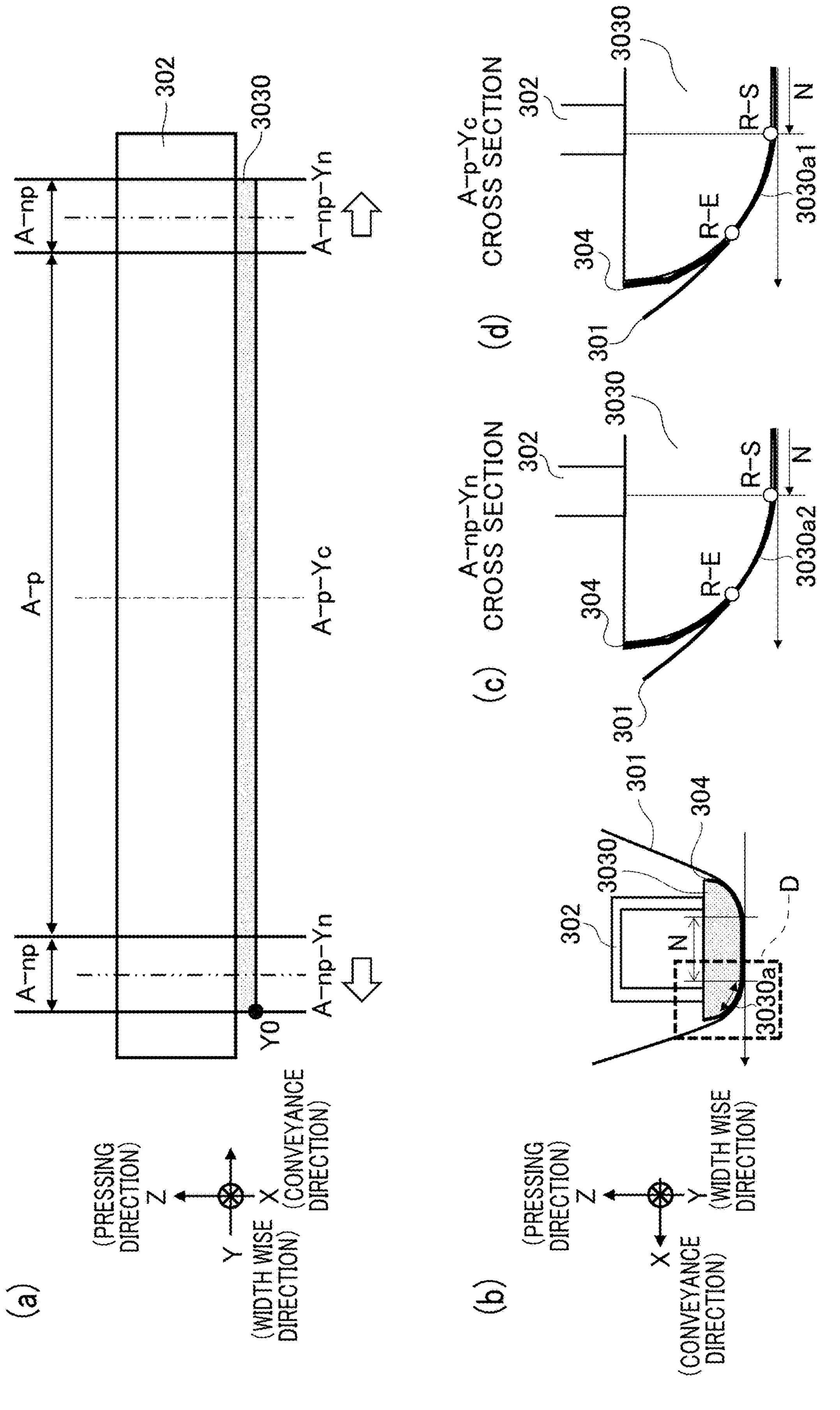

Part (a) of FIG. 7 is a schematic view of a stay and a pad according to a Comparative Example 1 as seen from a downstream side in a conveyance direction, part (b) of FIG. 7 is a cross-sectional view of an outline configuration of a belt, the stay and the pad according to the Comparative Example 1, part (c) of FIG. 7 is an enlarged view of a portion D in part (b) at a position of A-np-Yn in part (a), and part (d) of FIG. 7 is an enlarged view of the portion D in part (b) at a position of A-p-Yc in part (a).

Figure 8:
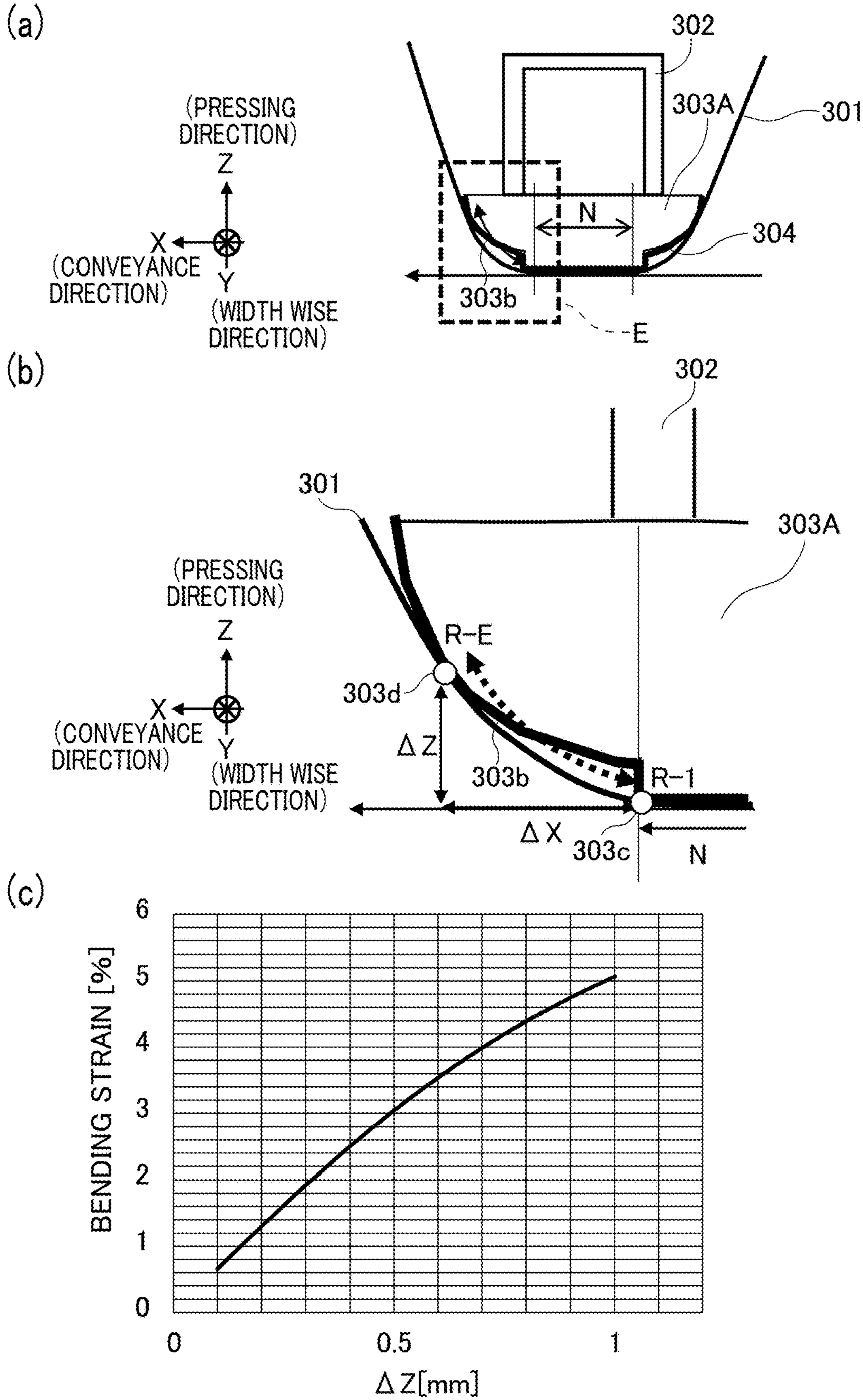

Part (a) of FIG. 8 is a cross-sectional view of an outline configuration of a belt, a stay and a pad according to an Embodiment 2, part (b) of FIG. 8 is an enlarged view of a portion E in part (a), and part (c) of FIG. 8 is a graph showing relationship between AZ and the bending strain.

Figure 9:
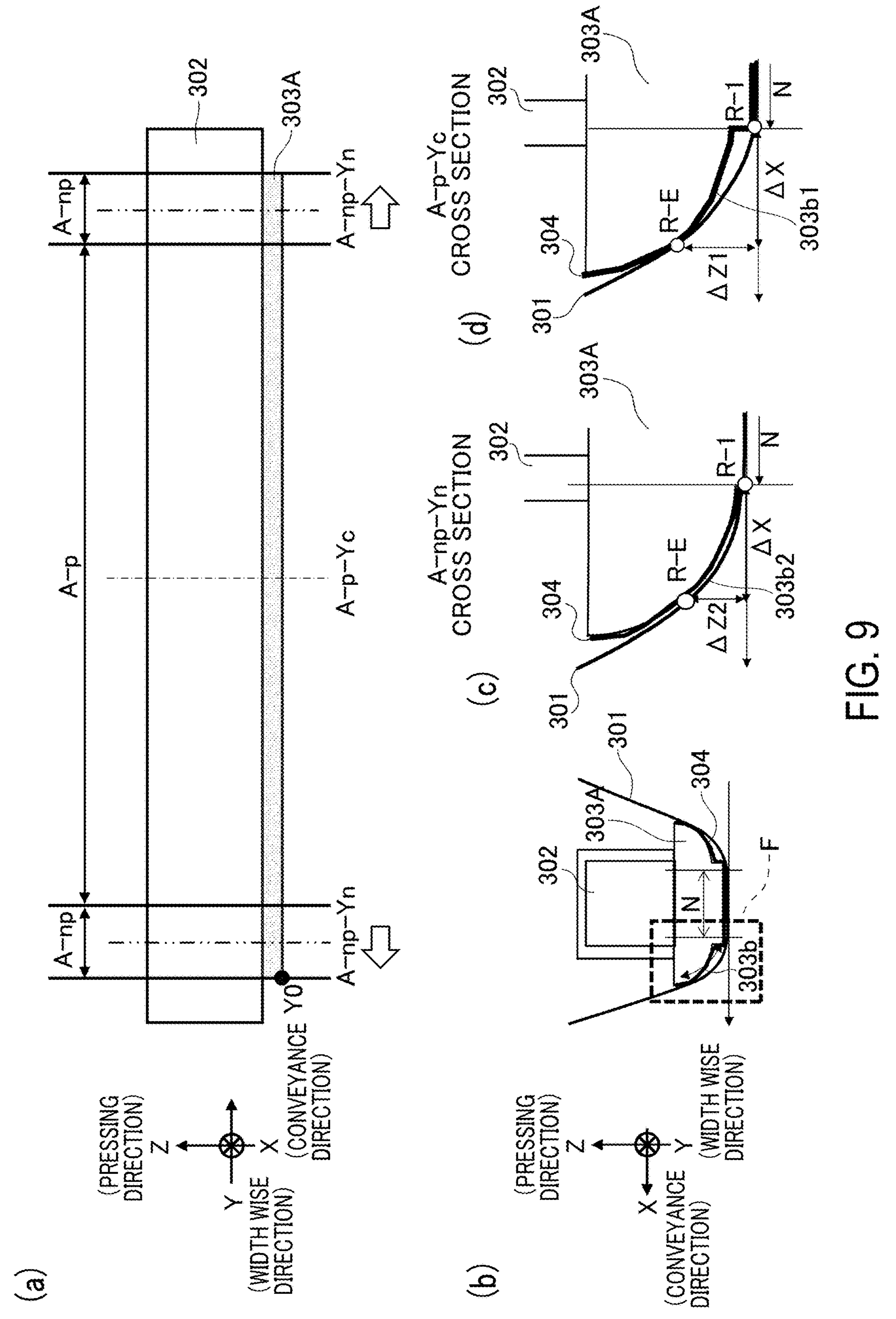

Part (a) of FIG. 9 is a schematic view of the stay and the pad according to the Embodiment 2 as seen from a downstream side in a conveyance direction, part (b) of FIG. 9 is a cross-sectional view of the outline configuration of the belt, the stay and the pad according to the Embodiment 2, part (c) of FIG. 9 is an enlarged view of a portion F in part (b) at a position of A-np-Yn in part (a), and part (d) of FIG. 9 is an enlarged view of the portion F in part (b) at a position of A-p-Yc in part (a).

Figure 10:
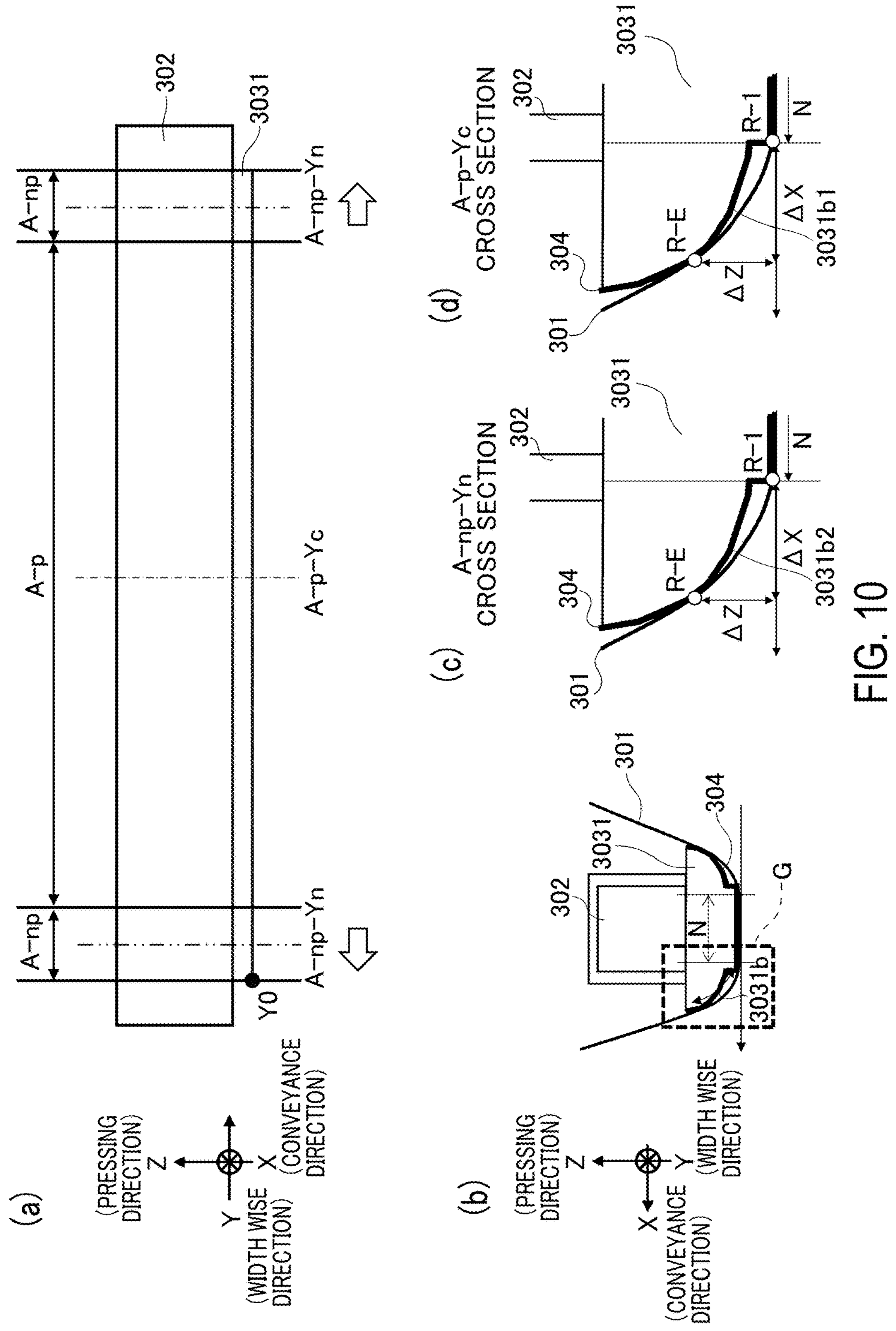

Part (a) of FIG. 10 is a schematic view of a stay and a pad according to a Comparative Example 2 as seen from a downstream side in a conveyance direction, part (b) of FIG. 10 is a cross-sectional view of an outline configuration of a belt, the stay and the pad according to the Comparative Example 2, part (c) of FIG. 10 is an enlarged view of a portion G in part (b) at a position of A-np-Yn in part (a), and part (d) of FIG. 10 is an enlarged view of the portion G in part (b) at a position of A-p-Yc in part (a).

FIG. 11 is a table showing verification results of the Embodiments and the Comparative Examples.

DESCRIPTION OF THE EMBODIMENTS

Embodiment 1

Figure 1:
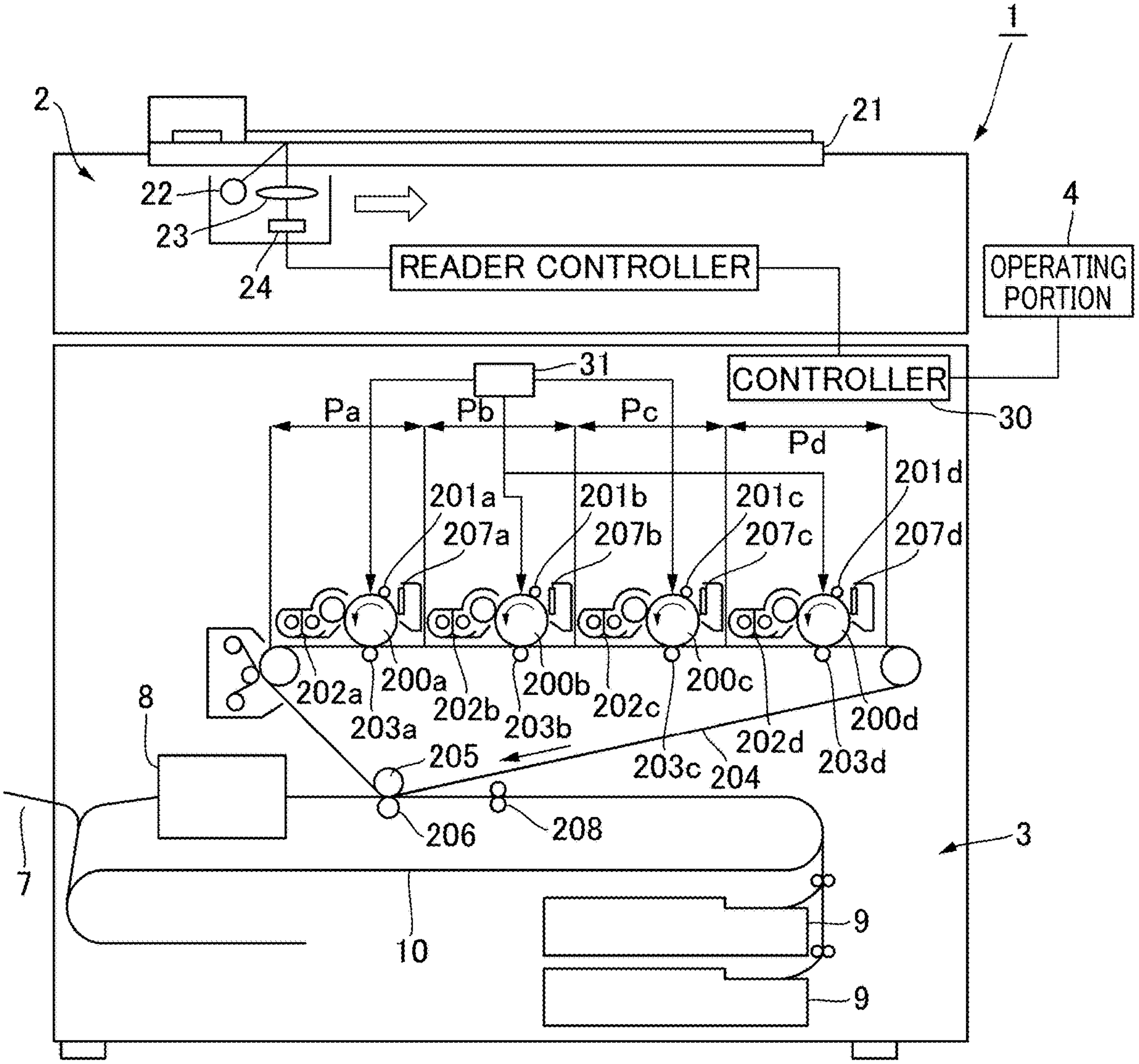
FIG. 1 is a cross-sectional view of an outline configuration of an image forming apparatus according to an Embodiment 1.

An Embodiment 1 will be described using FIG. 1 through part (d) of FIG. 7. First, an overall configuration of an image forming apparatus of the present Embodiment will be described using FIG. 1.

[Image Forming Apparatus]

An image forming apparatus 1 is a full-color printer of electrophotographic type, which is provided with four image forming portions Pa, Pb, Pc and Pd, which are provided correspondingly to four colors of yellow, magenta, cyan and black. In the present Embodiment, it is configured as a tandem type, in which the image forming portions Pa, Pb, Pc and Pd are disposed along a rotational direction of an intermediary transfer belt 204, which will be described below. The image forming apparatus 1 forms a toner image (an image) on a recording material corresponding to an image signal from an image reading portion (document reading apparatus) 2 connected to a main assembly of the image forming apparatus 3 or a host device such as a personal computer communicably connected to the main assembly of the image forming apparatus 3. Examples of the recording material include sheet material such as a paper, a plastic film and cloth.

The image forming apparatus 1 is provided with the image reading portion 2 and the main assembly of the image forming apparatus 3. The image reading portion 2 is what reads a document placed on a document table glass 21, and light emitted from a light source 22 is reflected by the document and an image is formed on a CCD sensor 24 via an optical system member 23 such as a lens. By scanning in a direction of a hollow arrow, such optical system unit converts the document into an electrical signal data sequence of each line. The image signal obtained by the CCD sensor 24 is sent to the main assembly of image forming apparatus 3, and an image processing tailored to each image forming portion is performed in a control portion 30, which will be described below. In addition, the control portion 30 also receives, as an image signal, an external input from an external host device such as a print server.

The main assembly of the image forming apparatus 3 is provided with the plurality of the image forming portions Pa, Pb, Pc and Pd, and in each image forming portion, image formation is performed based on the image signal described above. That is, the image signal is converted into a pulse width modulated (PWM) laser beam by the control portion 30. A polygon scanner 31 as an exposure device scans the laser beam, which corresponds to the image signal. Then, the laser beams are irradiated to photosensitive drums 200*a* through 200*d* as image bearing members for each of the image forming portions Pa through Pd.

Incidentally, Pa is the image forming portion for yellow color (Y), Pb is the image forming portion for magenta color (M), Pc is the image forming portion for cyan color (C), and Pd is the image forming portion for black color (Bk), and each forms an image of the corresponding color. Since the image forming portions Pa through Pd are substantially the same, details of the image forming portion Pa for Y will be described below and the description for the other image forming portions will be omitted. In the image forming portion Pa, the toner image is formed on a surface of a photosensitive drum 200*a* based on the image signal, as described below.

A charging roller 201*a* as a primary charger charges the surface of the photosensitive drum 200*a* to a predetermined potential and prepares for an electrostatic latent image formation. By the laser beam from the polygon scanner 31, an electrostatic latent image is formed on the surface of the photosensitive drum 200*a*, which is charged to the predetermined potential. A developing unit 202*a* develops the electrostatic latent image on the photosensitive drum 200*a* and forms the toner image. A primary transfer roller 203*a* performs electric discharge from a back surface of the intermediary transfer belt 204 and applies a primary transfer bias having opposite polarity to toner to transfer the toner image, which is on the photosensitive drum 200*a*, to the intermediary transfer belt 204. For the photosensitive drum 200*a* after the transfer, the surface thereof is cleaned by a cleaner 207*a*.

In addition, the toner image on the intermediary transfer belt 204 is conveyed to a next image forming portion, in an order of Y, M, C and Bk, and the toner image of each color formed in each image forming portion is transferred sequentially, and an image of the four colors is formed on the surface thereof. Then, the toner image which has passed through the image forming portion Pd for Bk, which is disposed furthest downstream in the rotational direction of the intermediary transfer belt 204, is conveyed to a secondary transfer portion, which is constituted by a secondary transfer roller pair 205 and 206. Then, in the secondary transfer portion, by a secondary transfer electric field having opposite polarity to the toner image on the intermediary transfer belt 204 being applied, the toner image is secondarily transferred to the recording material.

The recording material is accommodated in a cassette 9, and the recording material fed from the cassette 9 is conveyed to a registration portion 208, which is constituted by a pair of registration rollers, for example, and waits in the registration portion 208. After that, a timing is controlled to align positions the toner image on the intermediary transfer belt 204 and the sheet, and the registration portion 208 conveys the recording material to the secondary transfer portion.

The recording material, to which the toner image has been transferred in the secondary transfer portion, is conveyed to a fixing device 8, and in the fixing device 8, the toner image carried on the recording material is fixed to the recording material by being heated and pressed. The recording material which has passed through the fixing device 8 is discharged onto a discharge tray 7. Incidentally, in a case in which images are formed on both sides of the recording material, when the transfer and fixing of the toner image to a first surface (front surface) of the recording material is completed, the front and a back of the recording material are reversed through a reverse conveyance portion 10, the transfer and fixing of the toner image to a second surface (back surface) of the recording material are performed, and the recording material is stacked on the discharge tray 7.

Incidentally, the control portion 30 performs control of the entire image forming apparatus 1 as described above. In addition, the control portion 30 is capable of various types of settings etc. based on an input from an operating portion 4 provided to the image forming apparatus 1. Such control portion 30 includes a CPU (Central Processing Unit), a ROM (Read Only Memory) and a RAM (Random Access Memory). The CPU performs control of each portion while reading programs corresponding to control procedures stored in the ROM. In addition, in the RAM, working data and input data are stored, and the CPU performs control with reference to the data stored in the RAM based on the aforementioned program, etc.

[Fixing Device]

Next, a configuration of the fixing device 8 will be described using part (a) and part (b) of FIG. 2. In the present Embodiment, a fixing device of a belt heating method using an endless belt is employed. In part (a) of FIG. 2, an X direction represents a conveyance direction of a recording material P (not shown in the figure), a Y direction represents a widthwise direction of the recording material crossing (perpendicular to, in the present Embodiment) the conveyance direction of the recording material, and a Z direction represents a pressing direction, which is a direction in which the recording material is pressed in a nip portion N. In the present Embodiment, the X direction, the Y direction and the Z direction are directions perpendicular to each other.

The fixing device 8 includes a fixing belt (hereinafter, "belt") 301, a stay 302, a pressing pad (hereinafter, "pad") 303, a sliding member 304, a pressing roller 305, a heating roller 307, and a steering roller 308, etc. The belt 301 is a rotatable heating member, which is endless and rotatable. The pressing roller 305 as a rotating member is a rotatable pressing member, which is in contact with an outer peripheral surface of the belt 301 and forms the nip portion N for nipping and conveying the recording material between itself and the belt 301.

The sliding member 304 slides with an inner peripheral surface of the belt 301 in the nip portion N. The pad 303 as a backup member and a pad member is, inside the belt 301, disposed so as to nip the sliding member 304 and the belt 301 between itself and the pressing roller 305, and backs up the sliding member 304. The sliding member 304 is disposed so as to cover an outer peripheral surface of the pad 303 on the belt 301 side. The stay 302 is, inside the belt 301, disposed on an opposite side of the nip portion N with the pad 303 in between, and supports the pad 303. The heating roller 307 is disposed inside the belt 301 so as to stretch the belt 301 and heat the belt 301. The steering roller 308 is disposed inside the belt 301 so as to stretch the belt 301, and it applies tension to the belt 301 and performs shift control of the belt 301, as described below. Hereinafter, each configuration will be described in detail.

The belt 301 has thermal conductivity and heat resistance etc. and has a cylindrical shape of thin wall. In the present Embodiment, as shown in part (b) of FIG. 2, the belt 301 is configured to have a three-layer structure, in which a base layer 301*a*, an elastic layer 301*b* on an outer periphery of the base layer 301*a* and a releasing layer 301*c* on an outer periphery of the elastic layer 301*b* are formed. For the base layer 301*a*, for example, a thickness is 80 μm, and for material thereof, polyimide resin (PI) is used. For the elastic layer 301*b*, for example, a thickness is 300 μm and silicone rubber is used. For the releasing layer 301*c*, for example, a thickness is 30 μm and PFA (tetrafluoroethylene perfluoroalkoxyethylene copolymerization resin) as fluororesin is used. The belt 301 is stretched by the pad 303 and the heating roller 307. In addition, an outer diameter of the belt 301 is configured to be 150 mm in the present Embodiment.

The pad 303 is, inside the belt 301, disposed so as to be opposing to the pressing roller 305 across the belt 301, and forms the nip portion N for nipping and conveying the recording material between the belt 301 and the pressing roller 305. In the present Embodiment, the pad 303 is a member, which is long along a widthwise direction of the belt 301 (a longitudinal direction crossing a rotational direction of the belt 301, a rotational axis direction of the heating roller 307) and has an approximately plate shape. By the pad 303 being pressed against the pressing roller 305 across the belt 301, the nip portion N is formed. For material of the pad 303, LCP (liquid crystal polymer) resin is used. Between the pad 303 and the belt 301, the sliding member 304 is interposed. Details of the sliding member 304 will be described below.

The pad 303 is supported by the stay 302 as a supporting member, which is disposed inside the belt 301. That is, the stay 302 is disposed on an opposite side of the pad 303 to the pressing roller 305 and supports the pad 303. Such stay 302 is a reinforcing member, which is long along the longitudinal direction of belt 301 and has rigidity, and is in contact with the pad 303 and backs up the pad 303. That is, upon the pad 303 being pressed from the pressing roller 305, the stay 302 provides strength to the pad 303 and secures pressing force in the nip portion N. In the stay 302, an end portion in a widthwise direction thereof is supported by a frame.

The stay 302 is made of metal, such as stainless steel, and a cross section (crossing surface), which is perpendicular to the longitudinal direction of the stay 302 crossing the rotational direction of the belt 301, is approximately rectangular shape. For example, for the stay 302, a pultruded member of SUS304 (stainless steel) having a wall thickness of 3 mm is used, and by forming the cross section of the stay 302 into a hollow of an approximately rectangular shape, strength thereof is secured. Incidentally, the cross section of the stay 302 may be formed into the approximately rectangular shape by combining a plurality of sheet metals and fixing the sheet metals to each other by welding, etc. In addition, the material of the stay 302 is not limited to the stainless steel as long as the strength thereof can be guaranteed.

The heating roller 307 is disposed inside the belt 301 and stretches the belt 301 together with the pad 303 and the steering roller 308. The heating roller 307 is formed of metal such as aluminum and stainless steel into a cylindrical shape, and inside the heating roller 307, a halogen heater 306 as a heating source for heating the belt 301 is provided. And the heating roller 307 is heated to a predetermined temperature by the halogen heater 306. In addition, in the heating roller 307, an end portion in a widthwise direction thereof is supported and urged by the frame and a bearing (not shown) and is rotatable.

The steering roller 308 has a rotation center at one end portion in a longitudinal direction thereof or near a center thereof, and by being rotated with respect to the belt 301, a tension difference is generated between front and rear, thereby controlling a position (shifted position) in a main scanning direction (widthwise direction) of the belt 301. In addition, the steering roller 308 is urged by a spring, which is supported by the unshown frame, and is also a tension roller, which provides a predetermined tension SF to the belt 301. That is, the steering roller 308 as a tension applying member is disposed inside the belt 301 and stretches the belt 301 together with the pad 303 to apply the tension SF to the belt 301. The tension SF applied to the belt 301 is preferably about from 40 N to 120 N.

In the present Embodiment, the heating roller 307 is formed of, for example, a pipe made of stainless steel and having a thickness of 1 mm. In addition, the halogen heater 306 may be one, however, it is preferable to have a plurality of the halogen heaters 306 in view of temperature distribution control in the longitudinal direction (rotational axis direction) of the heating roller 307. The provided plurality of the halogen heaters 306 have lighting distribution, which differs from each other in the longitudinal direction, and a lighting ratio is controlled corresponding to a size of the recording material. In the present Embodiment, three halogen heaters 306 are disposed. Incidentally, the heating source is not limited to the halogen heater, but can also be other heaters, which are capable of heating the heating roller 307, for example, such as a carbon heater. The belt 301 is heated by the heating roller 307 heated by the halogen heater 306 and controlled to a predetermined target temperature corresponding to a type of the recording material based on temperature detection by an unshown thermistor (temperature detecting member).

The pressing roller 305 is also a rotating driving member, which rotates with contacting the outer peripheral surface of the belt 301 and applies driving force to the belt 301. Incidentally, in the present Embodiment, the heating roller 307 is also rotationally driven by a driving source (for example, a driving motor), and it applies driving force to the belt 301. However, the application of the driving force to the heating roller 307 may be omitted. The pressing roller 305 is a roller, in which a core metal (shaft) 305*c*, an elastic layer 305*b* on an outer periphery of the core metal 305*c*, and a releasing layer 305*a* on an outer periphery of the elastic layer 305*b* are formed. For the core metal 305*c*, for example, stainless steel having a diameter of 72 mm is used. For the elastic layer 305*b*, for example, conductive silicone rubber having a thickness of 8 mm is used. For the releasing layer 305*a*, for example, PFA (tetrafluoroethylene perfluoroalkoxyethylene copolymerization resin) as fluororesin having a thickness of 100 μm is used. The pressing roller 305 is rotatably supported by the frame (not shown) of the fixing device 8, and a gear is fixed to one end portion thereof, and the pressing roller 305 is rotationally driven by being connected to a driving source (e.g., a driving motor, not shown) via a gear. In addition, the pressing roller 305 is pressed by a pressing mechanism 309 so as to press the belt 301 toward the pad 303. The pressing mechanism 309 includes a pressing arm 310, which is connected to the core metal 305*c*, and by the pressing arm 310 receiving force from an unshown driving mechanism and swinging about a swing center 311, the pressing roller 305 is pressed with a pressing force PF toward the pad 303.

The fixing device 8 heats the toner image in the nip portion N formed between the belt 301 and the pressing roller 305, while nipping and conveying the recording material P carrying the toner image. In this manner, the fixing device 8, while nipping and conveying the recording material P, fixes the toner image to the recording material P. Therefore, it is necessary for the fixing device 8 to work well in both functions of applying heat and pressure and of conveying the recording material P. By an unshown driving source, the pressing roller 305 is pressed against the sliding member 304 via the belt 301. In the present Embodiment, pressing force (NF) in the nip portion N during image formation is 1600 N, and it is configured so that a width in the X direction (conveyance direction of the recording material) of the nip portion N is 24.5 mm, and a width in the Y direction (widthwise direction of the recording material) thereof is 326 mm.

[Sliding Member]

The sliding member 304 is fixed by a screw, etc. to the stay 302 via the pad 303. Incidentally, the sliding member 304 may be integrated with the pad 303. In addition, a part of the sliding member 304 may be fixed to the stay 302 and/or the pad 303. For example, both end portions in the Y direction (widthwise direction) of the sliding member 304 may be fixed to the pad 303 by screws, etc. The sliding member 304 in the present Embodiment is configured to cover the pad 303 regardless of an inside and an outside of the nip portion N. Hereinafter, not shown here, however, it is acceptable as long as a part of the nip portion N is covered by the sliding member 304. That is, a configuration in which the sliding member 304 is disposed only in the nip portion N is also acceptable.

The sliding member 304 is constituted by a base material layer 304*a* and a sliding layer 304*c*. On a side of the base material layer 304*a* which slides with the belt 301, a plurality of projections 304*b*, which project toward the inner peripheral surface of the belt 301, are formed. The sliding layer 304*c* is provided so as to cover a surface on the side of the base material layer 304*a* which slides with the belt 301 (including the plurality of the projections 304*b*). Incidentally, a projecting portion formed by the projection 304*b* being covered by the sliding layer 304*c* is referred to as an embossed portion 304*d*.

The base material layer 304*a* only has to have sufficient heat resistance and strength. Examples of material include stainless steel, copper, aluminum, engineering plastics (PI (polyimide), PEEK (polyether ether ketone), LCP (liquid crystal polymer), etc.), and metallic material such as stainless steel, copper and aluminum are desirable in the present Embodiment. In the present Embodiment, as the base material layer 304*a*, PI having a thickness of 300 μm is employed.

The plurality of the projections 304*b* are provided from the base material layer 304*a* toward the inner peripheral surface of the belt 301. In addition, the plurality of the projections 304*b* are integrally formed with the base material layer 304*a* with the same material and are arranged across the conveyance direction of the recording material (X direction) in the nip portion N and across the widthwise direction of the recording material crossing the conveyance direction (Y direction), respectively. A distance (interval) d between centers of the adjacent projections 304*b* with respect to the conveyance direction and a distance (interval) d between centers of the adjacent projections 304*b* with respect to the widthwise direction are preferably 1.25 mm or more and 1.4 mm or more, respectively. In the present Embodiment, in order to make sliding performance with the belt 301 even, the distance between the plurality of the projections 304*b* are configured to be the same in the conveyance direction and the widthwise direction, and each distance d is configured to be 1.4 mm. In addition, the plurality of the projections 304*b* are distributed in the nip portion N and outside the nip portion N (a passing through region and a non-passing through region, which are described below) with respect to the widthwise direction.

In this manner, by providing the plurality of the projections 304*b* to the surface (sliding surface) of the sliding member 304 on the side sliding with the belt 301, a contact area between the sliding member 304 and the belt 301 is reduced and sliding resistance between the sliding member 304 and the belt 301 is reduced. The projection 304*b* is formed so that a leading side surface to be flat and the projection 304*b* is approximately cylindrical.

It is preferable that the sliding layer 304*c* be formed of a coating agent such as fluororesin (PTFE (polytetrafluoroethylene), PFA, etc.) to realize low friction. In the present Embodiment, the sliding member 304 is formed by coating PTFE, which has a thickness of 20 μm, on the surface of the base material layer 304*a*, which includes the plurality of the projections 304*b*. In addition, in the present Embodiment, lubricant is applied to the inner surface of the belt 301. As a result, the belt 301 has a configuration which slides smoothly with the sliding member 304. As the lubricant, silicone oil is used. Incidentally, in the present Embodiment, it is configured as the sliding layer 304*c* is provided to the base material layer 304*a*, however it may be a configuration in which an adhesion layer is provided between the base material layer 304*a* and the sliding layer 304*c*. By using the adhesion layer, in a case in which metallic material such as stainless steel, copper and aluminum is used for the base material layer 304*a*, it becomes possible to develop good adhesive strength between the base material layer 304*a* and the sliding layer 304*c*.

In addition, the sliding member 304 in the present Embodiment is configured to cover the pad 303 regardless of inside and outside the nip portion N. That is, except for a surface of the pad 303 on an opposite side to the nip portion N, an entire surface opposing to the belt 301 is covered by the sliding member 304. In addition, the plurality of the projections 304*b* are disposed in an entire region of the sliding member 304. Hereinafter, not shown here, however, it is acceptable that a configuration in which the embossed portion 304*d* is disposed in a part of the nip portion N. That is, a configuration in which the embossed portion 304*d* is disposed only in the nip portion N is also acceptable.

[Factors Causing Shortening of a Life of the Belt.]

Next, using part (a) of FIG. 3 through part (c) of FIG. 4, factors which cause fatigue failure (cracks) to occur in the belt 301 and shortening of a life of the belt 301 will be described. Part (a) of FIG. 3 is a schematic view illustrating positions of the stay 302 and the pad 303 as seen from above in the pressing direction. Part (b) of FIG. 3 is a view schematically illustrating a cross-section, which shows positions of the stay 302 and the pad 303 from a downstream in the conveyance direction. Part (c) of FIG. 3 is view schematically illustrating a cross-section at an A-p-Yc position (central position in the longitudinal direction of the stay 302) in part (b) of FIG. 3.

A region (area) of A-p in part (a) of FIG. 3 is, in the nip portion N, a region through which a recording material with a maximum size, which can be used in the image forming apparatus 1, passes (hereinafter, referred to as the "passing through region" or the "A-p region"). In addition, a region of A-np in part (a) of FIG. 3 is, in the nip portion N, a region where the recording material with the maximum size does not pass through (hereinafter, referred to as the "non-passing through region" or the "A-np region").

The A-np region (non-passing through region) is positioned outside the A-p region (passing through region) with respect to the widthwise direction. In addition, the embossed portion 304*d* may be provided in the A-np region. In the present Embodiment, it is configured that a width of the A-p region is 340 mm and that of the A-np region is 15 mm. A curved portion 303*a* in part (c) of FIG. 3 is a region in which the belt 301 is curved to a specific curvature by being stretched by the steering roller 308 (not shown) from the inner peripheral surface thereof. That is, the pad 303 includes, in a downstream side of the nip portion N with respect to the conveyance direction of the recording material, the curved portion 303*a*, which is continuous to a downstream end of the nip portion N and curved so as to bring the sliding member 304 into contact with the belt 301 and curves the belt 301 so as to separate the recording material passed through the nip portion N from the belt 301. Incidentally, in a case in which the sliding member 304 is not provided in the curved portion 303*a*, by the curved portion 303*a* directly contacting the belt 301, the belt 301 is curved. The pad 303 is configured, in order to stably ensure the A-p region through which the recording material passes in the nip portion N, to have a width longer than that of the pressing roller 305. That is, the pad 303 is configured, in order to stably ensure the A-p region, to form the A-np region outside of the A-p region in the widthwise direction.

As mentioned above, in order to improve separating performance of the recording material from the belt 301, the belt 301 is stretched by the steering roller 308 and the belt 301 is curved to a specific radius of curvature at the curved portion 303*a* downstream of the nip portion N. By making the radius of curvature of the belt 301 downstream of the nip portion N smaller, separating energy is given to the recording material during conveyance of the recording material so that the separating energy is more than adhesion energy between the toner and the belt 301. By this, the recording material after the toner fixing is separated from the belt 301 and conveyed. On the other hand, upon curving the belt 301 with the radius of curvature more than necessary, unnecessary large strain is generated in the belt 301. As a result, the belt 301 is subject to significant strain repeatedly as the belt 301 is rotated. And fatigue failure may then occur in the belt 301, such as cracking in the base layer 301*a* of the belt 301 may occur, resulting in the shortening of the life of the belt 301.

Part (a) of FIG. 4 is a graph showing distribution of peak pressure in the longitudinal direction (widthwise direction) generated between the curved portion 303*a*, which curves the belt 301 to the specific curvature by stretching the belt 301 from the inner peripheral surface with the steering roller 308 and the pad 303, and the belt. Part (b) of FIG. 4 and part (c) of FIG. 4 are cross-sectional views of outline configurations showing observed results of a vicinity of the nip portion N at the positions of an A-np-Y1 and an A-p-Yc in part (a) of FIG. 4, respectively.

As it can be seen from the results in part (a) of FIG. 4, in the A-p region, pressure applied to the curved portion 303*a* of the pad 303 is low due to the tension SF applied to the belt 301 from the steering roller 308. In contrast, in the A-np region, the pressure applied to the curved portion 303*a* of the pad 303 is high due to the tension SF applied to the belt 301 from the steering roller 308. Upon the tension SF of the steering roller 308 being applied to the belt 301, followability of the belt 301 to the curved portion 303*a* changes. And the tension SF, which is applied to the belt 301 from the steering roller 308, becomes partially higher, and the peak pressure applied to the curved portion 303*a* becomes higher, i.e., it can be assumed that upon the followability of the belt 301 to the curved portion 303*a* being increased, the radius of curvature of the belt 301 in the curved portion 303*a* of that part becomes smaller.

In addition, also from the observed results in part (b) of FIG. 4 and part (c) of FIG. 4, it can be confirmed that, in the A-np-Y1 cross section, in which the peak pressure of the curved portion 303*a* due to the tension SF is large, the radius of curvature of the belt 301 in the curved portion 303*a* downstream of the nip portion N is small, and in the A-p-Yc cross-section, in which the peak pressure of the curved portion 303*a* due to the tension SF is small, the radius of curvature of the belt 301 in the curved portion 303*a* downstream of the nip portion N is large. Therefore, although the radius of curvature of the belt 301 curved by the curved portion 303*a*, which is originally necessary to improve the separating performance of the recording material, is small enough in the A-p-Yc cross section, the radius of curvature of the belt 301 curved by the curved portion 303*a* becomes even smaller in the A-np-Y1 cross-section, through which the recording material does not pass.

Therefore, it is found that without taking any countermeasures, excessive strain occurs in the belt 301, which is curved by the curved portion 303*a* in the A-np region, through which the recording material does not pass, and the fatigue failure occurs as the belt 301 is rotated. As a cause of above, assuming that it is due to shape deformation of the pad 303, the heating roller 307 and the steering roller 308 upon stretching the belt 301 by disposing a spring at an end portion of the steering roller 308. That is, it can be assumed that it is because, upon the tension being applied to the belt 301 by the steering roller 308, an inside of the fixing device 8 is deformed and the tension is applied stronger in the A-np region than in the A-p region.

[Configuration of the Curved Portion of the Pad]

As described above, it is found that, without taking any countermeasures for the curved portion 303*a* of the pad 303, although the radius of curvature of the belt 301 curved by the curved portion 303*a*, which is necessary to improve the separating performance of the recording material, is sufficiently small in the A-p-Yc cross-section, the radius of curvature of the belt 301 curved by the curved portion 303*a* is even smaller in the A-np-Y1 cross-section, through which the recording material does not pass. To solve the above problem, in the present Embodiment, a shape of the pad 303 is configured so that the bending strain in the A-np region, in which it is not necessary to improve the separating performance of the recording material, is smaller than that in the A-p region, in which it is necessary to improve the separating performance of the recording material.

Next, using part (a) through part (c) of FIG. 5, upon the belt 301 being curved to the specific radius of curvature in the curved portion downstream of the nip portion N, a calculating method for the strain generated in the belt 301 will be described step-by-step. First, the curved portion 303*a*, in which the pad 303 and the belt 301 contact each other to curve the belt 301, is measured with a pressure sensitive paper to identify a region of the curved portion 303*a*. Next, according to a shape of the region, dimensions of each part are measured. Finally, the measured values are substituted into a theoretical formula to calculate the strain at each part. In part (a) of FIG. 5, a cross-sectional view of the belt 301, the stay 302 and the pad 303 near the nip portion N is illustrated. Part (b) of FIG. 5 is an enlarged view of a portion B enclosed by a dotted line in part (a) of FIG. 5.

As described above, first, the region of the curved portion 303*a*, where the pad 303 and the belt 301 contact each other to curve the belt 301, is measured with the pressure sensitive paper and identified. In the measurement, a three dimensional shape measuring machine VR-3200 manufactured by Keyence Corporation and a pressure sensitive paper Prescale manufactured by Fujifilm Corporation are used. For the Prescale manufactured by Fujifilm, to match a measured pressure range (0.2 MPa or more and 0.6 MPa or less), the Prescale for ultra-low pressure (LLLW) is used. In the fixing device 8 shown in part (a) of FIG. 2, the pressing of the steering roller 308 with the spring is removed and the belt 301 is removed along the longitudinal direction thereof. Next, the Prescale is disposed and fixed in the entire longitude of the pad 303 so that from the nip portion N to the curved portion 303*a*, which are shown in part (a) and part (b) of FIG. 5, is covered. After disposing the Prescale, the belt 301 is inserted into the fixing device 8, and furthermore, the pressing of the steering roller 308 with the spring is released and pressure is applied to the belt 301 by the steering roller 308. After applying the pressure, again, the pressing of the steering roller 308 with the spring is removed and the belt 301 is removed. Upon observing the collected Prescale, by the pad 303 and the belt 301 contacting each other and the pressure being applied to the curved portion 303*a*, which curves the belt 301, only a contact region changes to red. The contact region in the Prescale after the change of the color is measured in two dimensions with the three dimensional shape measuring machine VR-3200 manufactured by Keyence Corporation, and this contact region is calculated as the curved portion 303*a*. Upon measuring, it is preferable to set magnification to 10 times or more. At this time, as shown in part (b) of FIG. 5, when the curved portion 303*a* is present continuously from the end of the nip portion furthest downstream, a starting point (a position of the end of the nip portion N furthest downstream) is defined as R-1 and an ending point of the curved portion 303*a* is defined as R-E.

Next, a measuring method for the dimensions of each part of the curved portion 303*a* and the calculating method for the bending strain generated in the belt 301 will be described. To calculate the strain generated in the belt 301, a radius of curvature R at a portion of the belt 301, which is curved, is calculated from the shape of the pad 303 at the curved portion 303*a*. First, the shape of the pad 303 is measured with the three dimensional shape measuring machine VR-3200 manufactured by Keyence Corporation. Upon measuring, it is preferable to set the magnification to 10 times or more. Upon measuring, the pad 303 is mounted to the measuring machine so that a surface thereof on the nip portion N side faces above, and a three dimensional shape thereof is acquired. A position in the longitudinal direction (position in the widthwise direction) to be measured is determined, and a shape profile in the pressing direction is output along the conveyance direction at that position in the longitudinal direction. From the shape profile, a center position of a section of R-1 through R-E in the curved portion 303*a*, which is calculated through the pressure sensitive paper measurement described above, is defined as R-C. A circle passing through the three points of R-1, R-C and R-E is drawn and a radius thereof is defined as r. At three or more locations in each region (the A-p region and the A-np region), r is measured and a mean value thereof is defined as the radius of curvature R of the curved portion 303*a*.

Finally, the measured radius of curvature R is substituted into the following theoretical formula to calculate a bending strain E. Upon calculation, a thickness of the base layer 301*a* of the belt 301 is defined as t, and t is uniformly set to a fixed value of 0.095 and substituted into the following formula.

$$E = \frac{t}{R} \times 100[\%] \quad \text{[Formula 1]}$$

Change in the bending strain E upon the radius of curvature R being changed using the above formula is shown in part (c) of FIG. 5. From part (c) of FIG. 5, it can be confirmed that as the radius of curvature R is decreased, the bending strain E increases.

Part (a) through part (d) of FIG. 6 are cross-sectional views of the nip portion N of the fixing device 8, which equips the pad 303 in the present Embodiment, respectively. Part (a) of FIG. 6 is a cross-sectional view of an outline configuration, in which the stay 302 and the pad 303 are cut along the widthwise direction and seen from downstream side in the conveyance direction. Part (b) of FIG. 6 is a cross-sectional view at an A-p-Yc position in part (a) of FIG. 6. Part (c) of FIG. 6 is a cross-sectional view, which enlarges a C portion enclosed by a dotted square portion in part (b) of FIG. 6, at an A-np-Yn position in part (a) of FIG. 6. Part (d) of FIG. 6 is a cross-sectional view, which enlarges the C portion in part (b) of FIG. 6, at the A-p-Yc position in part (a) of FIG. 6.

As shown in part (c) and part (d) of FIG. 6, in the present Embodiment, the shape of the pad 303 is configured so that the bending strain E at the A-np-Yn position is smaller than the bending strain E at the A-p-Yc position. Here, in the curved portion 303*a*, a region positioned in the downstream side in the conveyance direction of the A-P region, which is the passing through region where the recording material with the maximum size passes through the nip portion N, is defined as a first portion 303*a*1. In addition, in the curved portion 303*a*, a region positioned in the downstream side in the conveyance direction of the A-np region, which is the non-passing through region outside of the passing through region with respect to the widthwise direction (longitudinal direction), is defined as a second portion 303*a*2. That is, as shown in part (c) of FIG. 6, the region in the downstream side in the conveyance direction of the nip portion N at the A-np-Yn position is defined as the second portion 303*a*2, and as shown in part (d) of FIG. 6, the region in the downstream side in the conveyance direction of the nip portion N at the A-p-Yc position is defined as the first portion 303*a*1. In addition, the radius of curvature R of the first portion 303*a*1 of the curved portion 303*a* is defined as R1 and the radius of curvature R of the second portion 303*a*2 of the curved portion 303*a* is defined as R2. And, in the present Embodiment, the radius of curvature R2 of the second portion 303*a*2 is configured to be greater than the radius of curvature R1 of the first portion 303*a*1 (R2>R1).

Specifically, the radius of curvature R2 of the second portion 303*a*2 (A-np-Yn position) is set to 8 mm and the bending strain E thereof is set to 1.2%. In addition, the radius of curvature R1 of the first portion 303*al* (A-p-Yc position) is set to 4 mm and the bending strain E is set to 2.4% (Embodiment 1). For a region of a border of the A-p region and the A-np region, the shape is defined so that, as it goes, from an outer end portion side of the A-p region to the A-np region, outside in the longitudinal direction (directions of hollow arrows in part (a) of FIG. 6), the radius of curvature R, which is calculated in the cross-section cut along the pressing direction, increases continuously and gradually as it goes toward outside. That is, the curved portion 303*a* is formed so that the radius of curvature R is continuously increased from the first portion 303*a*1 to the second portion 303*a*2. Incidentally, in the above description, one side in the longitudinal direction has been described, however, also for the A-np region on the opposite side in the longitudinal direction, the same shape is provided.

Comparative Example 1

Part (a) through part (d) of FIG. 7 are cross-sectional views of the nip portion N of the fixing device 8, which equips a pad 3030 of a Comparative Example 1, which is for verifying effect of the present Embodiment, respectively. Part (a) of FIG. 7 is a cross-sectional view of an outline configuration, in which the stay 302 and the pad 3030 are cut along the widthwise direction and seen from downstream side in the conveyance direction.

Part (b) of FIG. 7 is a cross-sectional view at an A-p-Yc position in part (a) of FIG. 7. Part (c) of FIG. 7 is a cross-sectional view, which enlarges a D portion enclosed by a dotted square portion in part (b) of FIG. 7, at an A-np-Yn position in part (a) of FIG. 7. Part (d) of FIG. 7 is a cross-sectional view, which enlarges the D portion in part (b) of FIG. 7, at the A-p-Yc position in part (a) of FIG. 7.

In the Comparative Example 1, as shown in part (c) and part (d) of FIG. 7, the shape of the pad 3030 is set so that the bending strain E at an A-np-Yn position and the bending strain E due to the shape of the pad 3030 at an A-p-Yc position are the same. Incidentally, also in the Comparative Example 1, in a curved portion 3030*a*, a region positioned in the downstream side in the conveyance direction of an A-P region is defined as a first portion 3030*a*1 (part (d) of FIG. 7). In addition, in the curved portion 3030*a*, a region positioned in the downstream side in the conveyance direction of an A-np region is defined as a second portion 3030*a*2. In the Comparative Example 1, a radius of curvature R2 of the second portion 3030*a*2 is set to be the same as a radius of curvature R1 of the first portion 3030*a*1 (R2=R1).

Specifically, the radius of curvature R2 of the second portion 3030*a*2 (A-np-Yn position) is set to 4 mm and the bending strain E thereof is set to 2.4%. In addition, the radius of curvature R1 of the first portion 3030*a*1 (A-p-Yc position) is set to 4 mm and the bending strain E thereof is set to 2.4%. In the present description, one side in the longitudinal direction has been described, however, also for the A-np region on the opposite side in the longitudinal direction, the same shape is provided. As described using FIG. 4, in reality, the tension SF from the steering roller 308 is higher at the A-np-Yn position than at the A-p-Yc position. Therefore, the bending strains E are the same at the A-p-Yc position and the A-np-Yn position in calculation, however, in reality, it can be assumed that the bending strain generated at the A-np-Yn position becomes greater than that at the A-p-Yc position.

In this manner, in the present Embodiment, the radius of curvature R2 of the second portion 303*a*2 of the curved portion 303*a* is configured to be larger than the radius of curvature R1 of the first portion 303*a*1. Therefore, compared to the Comparative Example 1, in which R2 and R1 are the same, it becomes possible to make the bending strain E of the second portion 303*a*2 smaller. As described above, in the belt 301, which is curved by the curved portion 303*a* in the A-np region (i.e., the second portion 303*a*2), it is likely for excessive strain to be generated and for the fatigue failure to occur as the belt 301 is rotated.

In contrast, in the present Embodiment, by making the radius of curvature of the second portion 303*a*2 larger, it becomes possible to make the bending strain E, which is generated in the belt 301 curved by the second portion 303*a*2, smaller and suppress that the fatigue failure occurs in the belt 301. As a result, it becomes possible to suppress the shortening of the life of the belt 301.

Embodiment 2

An Embodiment 2 will be described using part (a) of FIG. 8 through part (d) of FIG. 10. In the Embodiment 1 described above, the configuration in which, in the pad 303, the curved portion 303*a* for separating the recording material from the belt 301 is present continuously from the end of the nip portion N furthest downstream is described.

In contrast to this, in the present Embodiment, in a pad 303A, a separation portion 303*b* for separating the recording material from the belt 301 includes a contact portion 303*d*, which is provided so as to be discontinuous to a downstream end 303*c*, which is a position of the nip portion N furthest downstream. Since other configurations and actions are the same as those in the Embodiment 1 described above, the same reference numerals will be attached to the same configurations to omit or simplify the description and illustration, and hereinafter, description will focus on points which differ from those of the Embodiment 1.

In a case of the present Embodiment, the pad 303A as a pad member includes the contact portion 303*d* which is provided in the downstream side of the nip portion N with respect to the conveyance direction of the recording material so as to be discontinuous to the downstream end 303*c* of the nip portion N, and brings the sliding member 304 into contact with the belt 301 or directly contacts the belt 301. That is, the pad 303A in the present Embodiment has a configuration in which a step is provided in the downstream side of the nip portion N. And the downstream end 303*c* of the nip portion N and the contact portion 303*d* constitute the separation portion 303*b*, which curves the belt 301 so as to separate the recording material passed through the nip portion N from the belt 301. Incidentally, of the plurality of projections 304*b*, the downstream end 303*c* of the nip portion N may be a downstream end of the projection 304*b* furthest downstream with respect to the conveyance direction. In addition, in a case in which the sliding member 304 is not present in the separation portion 303*b*, by the contact portion 303*d* directly contacting the belt 301, the belt 301 is curved.

Next, using part (a) through part (c) of FIG. 8, a calculating method for the strain, which is generated in the belt 301 when the belt 301 is curved to a specific radius of curvature by the separation portion 303*b* downstream of the nip portion N, will be described. The calculating method in the present Embodiment for the strain is the same as the calculating method described in the Embodiment 1. That is, first, the separation portion 303*b*, in which the pad 303A and the belt 301 contact each other and curve the belt 301, is measured with the pressure sensitive paper, and a region of the separation portion 303*b* is identified. Next, according to the shape of the region, dimensions of each part are measured. Finally, the measured values are substituted into a theoretical formula to calculate the strain at each part. In part (a) of FIG. 8, a cross-sectional view of the belt 301, the stay 302 and the pad 303A near the nip portion N is illustrated. Part (b) of FIG. 8 is an enlarged view of a portion E enclosed by a dotted line in part (a) of FIG. 8.

As in the Embodiment 1, the separation portion 303*b* is measured with the three dimensional shape measuring machine VR-3200 manufactured by Keyence Corporation and the pressure sensitive paper Prescale manufactured by Fujifilm Corporation. The measuring method is the same as in the Embodiment 1. And a contact region (a region in which the color is changed) of the collected Prescale is then measured in two dimensions with the three dimensional shape measuring machine VR-3200 manufactured by Keyence Corporation, and this contact area is calculated as the separation portion 303*b*. Upon measuring, it is preferable to set magnification to 10 times or more.

At this time, as shown in part (b) of FIG. 8, in a case in which one or a plurality of the contact portions 303*d* of the separation portion 303*b* are provided discontinuously to and separately from the downstream end 303*c* of the nip portion N, a starting point (a position of the nip portion N furthest downstream) is defined as R-1, a plurality of regions in which the color of the Prescale is changed (the plurality of the contact portions 303*d*) are defined as 303*b*-2, 303*b*-3, . . . 303*b*-E in order from the end of the nip portion N furthest downstream, and a center position of a rotational direction of each region is defined as R-2, R-3, . . . R-E. Incidentally, of the embossed portions 304*d* in the nip portion N, the position of R-1 may be a downstream end of the embossed portion 304*d*, which is provided furthest downstream with respect to the conveyance direction. In the example shown in part (b) of FIG. 8, a configuration, in which the separation portions 303*b* are constituted at two locations of R-1 of the downstream end 303*c* of the nip portion N and R-E of the contact portion 303*d*. However, the same applies to a case in which there is one or a plurality of the contact portions provided between R-1 and R-E.

Next, a measuring method for dimensions of each part of the separation portion 303*b* and the calculating method for the bending strain generated in the belt 301 will be described. A conveyance direction distance ΔX and a pressing direction distance ΔZ of a portion, which curves the belt 301 from the shape of the pad 303A in the separation portion 303*b*, is calculated. Here, the conveyance direction distance ΔX is a distance between the downstream end 303*c* of the nip portion N and the contact portion 303*d* with respect to the conveyance direction. The pressing direction distance ΔZ is a distance between a downstream end of the nip portion N and the contact portion 303*d* with respect to the pressing direction. Incidentally, the pressing direction is, as described above, the direction in which the recording material is pressed in the nip portion N, and is perpendicular to the conveyance direction and the widthwise direction, respectively.

The pressing direction distance ΔZ is defined as the distance between the downstream end of the nip portion N and the contact portion 303*d* with respect to the pressing direction. However, the nip portion is coated with the sliding layer 304*c* to improve sliding property with the belt. The pressing direction distance ΔZ may be a distance from a leading end of the sliding layer 304*c*, which contacts the belt 301 (see part (b) of FIG. 2) to the contact portion 303*d*, or a distance excluding the sliding layer 304*c*.

The sliding layer 304*c* is abraded by the slide with the belt. Therefore, the distance from a leading side of the projection 304*b* is preferable such that the pressing direction distance ΔZ is secured even after the fixing device is used for a certain number of times. On the other hand, it is also preferable to use the distance including the sliding layer 304*c* as the pressing direction distance ΔZ so that the pressing direction distance ΔZ is secured even from a beginning of a use of the fixing device.

In the calculation of the conveyance direction distance ΔX and the pressing direction distance ΔZ, first, the shape of the pad 303A is measured with the three dimensional shape measuring machine VR-3200 manufactured by Keyence Corporation. Upon measuring, it is preferable to set the magnification to 10 times or more. Upon measuring, the pad 303A is mounted to the measuring machine so that a surface thereof on the nip portion N side faces above, and a three dimensional shape is acquired. A position in the longitudinal direction (position in the widthwise direction) to be measured is determined, and a shape profile in the pressing direction is output along the conveyance direction at that position in the longitudinal direction. From the shape profile, coordinates of R-1 and R-E in the separation portion 303*b*, which is calculated by the pressure sensitive paper measurement described above, are confirmed. Based on these coordinates, the conveyance direction distance ΔX and the pressing direction distance ΔZ shown in part (b) of FIG. 8 are calculated. Three or more locations are measured in each region (the A-p region, the A-np region), and a mean value thereof is defined as the conveyance direction distance ΔX and the pressing direction distance ΔZ, respectively.

Finally, by substituting the measured conveyance direction distance ΔX and the pressing direction distance ΔZ into the following theoretical formula, the bending strain E is calculated. Upon calculation, the thickness of the base layer 301*a* of the belt 301 is defined as t, and t is uniformly set to the fixed value of 0.095 and substituted into the following formula.

$$E = t \times \frac{\Delta X}{\Delta Z\sqrt{\Delta X^2 + \Delta Z^2}} \times 100[\%] \quad \text{[Formula 2]}$$

A change in the bending strain E upon the pressing direction distance ΔZ being changed using the above formula is shown in part (c) of FIG. 8. Here, the calculation is performed with the conveyance direction distance ΔX fixed at a constant value of 1.2 mm. From part (c) of FIG. 8, it can be confirmed that, as the pressing direction distance ΔZ is increased, the bending strain E increases.

Part (a) through part (d) of FIG. 9 are cross-sectional views of the nip portion N of the fixing device 8, which equips the pad 303A in the present Embodiment, respectively. Part (a) of FIG. 9 is a cross-sectional view of an outline configuration, in which the stay 302 and the pad 303A are cut along the widthwise direction and seen from downstream side in the conveyance direction. Part (b) of FIG. 9 is a cross-sectional view at an A-p-Yc position in part (a) of FIG. 9. Part (c) of FIG. 9 is a cross-sectional view, which enlarges an F portion enclosed by a dotted square portion in part (b) of FIG. 9, at an A-np-Yn position in part (a) of FIG. 9. Part (d) of FIG. 9 is a cross-sectional view, which enlarges the F portion in part (b) of FIG. 9, at the A-p-Yc position in part (a) of FIG. 9.

As shown in part (c) and part (d) of FIG. 9, in the present Embodiment, the shape of the pad 303A is configured so that the bending strain E at the A-np-Yn position is smaller than the bending strain E at the A-p-Yc position. Here, in the separation portion 303*b*, a region positioned in the downstream side in the conveyance direction of the A-P region, which is the passing through region where the recording material with the maximum size passes through the nip portion N, is defined as a first portion 303*b*1. In addition, in the separation portion 303*b*, a region positioned in the downstream side in the conveyance direction of the A-np region, which is the non-passing through region outside of the passing through region with respect to the widthwise direction (longitudinal direction), is defined as a second portion 303*b*2. That is, as shown in part (c) of FIG. 9, the region in the downstream side in the conveyance direction of the nip portion N at the A-np-Yn position is defined as the second portion 303*b*2, and as shown in part (d) of FIG. 9, the region in the downstream side in the conveyance direction of the nip portion N at the A-p-Yc position is defined as the first portion 303*b*1. In addition, the pressing direction distance ΔZ of the first portion 303*b*1 of the separation portion 303*b* is defined as ΔZ1, and the pressing direction distance ΔZ of the second portion 303*b*2 of the separation portion 303*b* is defined as ΔZ2. And in the present Embodiment, the pressing direction distance ΔZ2 of the second portion 303*b*2 is configured to be shorter than the pressing direction distance ΔZ1 of the first portion 303*b*1 (ΔZ2<ΔZ1). The pressing direction distance ΔZ is preferably configured to be more than 0 mm and 1.5 mm or less.

Specifically, the conveyance direction distance ΔX of the second portion 303*b*2 (A-np-Yn position) is set to 1.2 mm, the pressing direction distance ΔZ2 is set to 0.2 mm, and the bending strain E is set to 1.3%. In addition, the conveyance direction distance ΔX of the first portion 303*b*1 (A-p-Yc position) is set to 1.2 mm, the pressing direction distance ΔZ2 is set to 0.9 mm, and the bending strain E is set to 4.8% (Embodiment 2). That is, the conveyance direction distance ΔX of the second portion 303*b*2 is configured to be the same as the conveyance direction distance ΔX of the first portion 303*b*1. In addition, for a region of a border of the A-p region and the A-np region, the shape is defined so that, as it goes, from an outer end portion side of the A-p region to the A-np region, outside in the longitudinal direction (directions of hollow arrows in part (a) of FIG. 9), the pressing direction distance ΔZ, which is calculated in the cross-section cut along the pressing direction, decreases continuously as it goes toward outside. That is, the separation portion 303*b* is formed so that the pressing direction distance ΔZ becomes continuously shorter from the first portion 303*b*1 toward the second portion 303*b*2. Incidentally, in the above description, one side in the longitudinal direction has been described, however, also for the A-np region on the opposite side in the longitudinal direction, the same shape is provided.

Comparative Example 2

Part (a) through part (d) of FIG. 10 are cross-sectional views of the nip portion N of the fixing device 8, which equips a pad 3031 of a Comparative Example 2, which is for verifying effect of the present Embodiment, respectively. Part (a) of FIG. 10 is a cross-sectional view of an outline configuration, in which the stay 302 and the pad 3031 are cut along the widthwise direction and seen from downstream side in the conveyance direction. Part (b) of FIG. 10 is a cross-sectional view at an A-p-Yc position in part (a) of FIG. 10. Part (c) of FIG. 10 is a cross-sectional view, which enlarges a G portion enclosed by a dotted square portion in part (b) of FIG. 10, at an A-np-Yn position in part (a) of FIG. 10. Part (d) of FIG. 10 is a cross-sectional view, which enlarges the G portion in part (b) of FIG. 10, at the A-p-Yc position in part (a) of FIG. 10.

In the Comparative Example 2, as shown in part (c) and part (d) of FIG. 10, the shape of the pad 3031 is configured so that the bending strain E at the A-np-Yn position and the bending strain E due to the shape of the pad 3031 at the A-p-Yc position are the same. Incidentally, also in the Comparative Example 2, in a separation portion 3031*b*, a region positioned in the downstream side in the conveyance direction of the A-P region is defined as a first portion 3031*b*1 (part (d) of FIG. 10). In addition, in the separation portion 3031*b*, a region positioned in the downstream side in the conveyance direction of the A-np region is defined as a second portion 3031*b*2. In the Comparative Example 2, a pressing direction distance ΔZ2 of the second portion 3031*b*2 is the same as a pressing direction distance ΔZ1 of the first portion 3031*b*1 (ΔZ2=ΔZ1).

Specifically, a conveyance direction distance ΔX of the second portion 3031*b*2 (A-np-Yn position) is set to 1.2 mm, the pressing direction distance ΔZ2 is set to 0.9 mm, and a bending strain E is set to 4.8%. In addition, a conveyance direction distance ΔX of the first portion 3031*b*1 (A-p-Yc position) is set to 1.2 mm, the pressing direction distance ΔZ1 is set to 0.9 mm, and a bending strain E is set to 4.8%. In the present description, one side in the longitudinal direction is described, however, also for the A-np region on the opposite side in the longitudinal direction, the same shape is provided. As described using FIG. 4, in reality, the tension SF from the steering roller 308 is higher at the A-np-Yn position than at the A-p-Yc position. Therefore, the bending strains E are the same at the A-p-Yc position and the A-np-Yn position in calculation, however, in reality, it can be assumed that the bending strain generated at the A-np-Yn position becomes greater than that at the A-p-Yc position.

In this manner, the pressing direction distance ΔZ2 of the second portion **303*b*2 of the separation portion 303*b* is configured to be shorter than the pressing direction distance ΔZ1 of the first portion 303*b*1. Therefore, compared to the Comparative Example 2, in which ΔZ2 and ΔZ1 are the same, it becomes possible to make the bending strain E of the second portion 303*b*2** smaller.

As described above, in the belt 301, which is curved by the separation portion **303*b* in the A-np region (i.e., the second portion 303*b*2), it is likely for excessive strain to be generated and for the fatigue failure to occur as the belt 301 is rotated. In contrast, in the present Embodiment, by making the pressing direction distance ΔZ2 of the second portion 303*b*2 shorter, it becomes possible to make the bending strain E, which is generated in the belt 301 curved by the second portion 303*b*2, smaller and suppress that the fatigue failure occurs in the belt 301. As a result, it becomes possible to suppress the shortening of the life of the belt 301**.

[Verification]

For the Embodiments 1 and 2 and the Comparative Examples 1 and 2 described above, a belt durability evaluation test and a sheet (recording material) separating performance evaluation test are conducted to verify effectiveness thereof, respectively. Hereinafter, after describing procedures for each verification test, verification results using the Embodiments 1 and 2 and the Comparative Examples 1 and 2 will be described.

[Procedure for the Belt Durability Evaluation Test]

In the belt durability evaluation test, to a printer (trade name: Canon Inc. imagePRESS V1000), a fixing device 8, to which the pad in the Embodiments 1 and 2 and the Comparative Examples 1 and 2 are assembled, respectively, is mounted and the life of the belt 301 is evaluated. A peripheral speed of the pressing roller 305, which is installed in the fixing device 8, is set to 450 mm/sec, and a regulated temperature of the halogen heater 306 is set to 190° C.

In the belt durability evaluation test, after continuously printing 10,000 sheets of papers with forming a specified image thereon, once, stopping operation of the printer is performed to check the belt 301, and then again, the procedure to continuously print 10,000 sheets of paper with the specified image thereon is repeated. And a number of printed sheets until a crack occurs in the belt 301 is defined as the life of the belt 301 (durable number of sheets). For damage at the end portion in the widthwise direction of the belt 301 is determined by visual inspection at the end portion in the widthwise direction of the belt 301. A configuration, in which the life is over 3000K (3000×1000) sheets, is defined as the configuration achieves a goal. Conditions for a temperature and a humidity at a time of the measurement is set to 23° C. and 30%. For the base layer **301*a* of the belt 301** for the present verification, material is set as polyimide and the thickness is set to 95 μm. For the sheet, CS-680 (manufactured by Canon Inc.) of A4 size is used.

[Procedure for the Separating Performance Evaluation Test of the Sheet]

In the separating performance evaluation test of the sheet, to the printer (trade name: Canon Inc. imagePRESSV1000), the fixing device 8, to which the pads in the Embodiments 1 and 2 and the Comparative Examples 1 and 2 is assembled, respectively, is mounted, and separating performance of the fixing device 8 of the sheet in each case is evaluated. A peripheral speed of the pressing roller 305, which is installed in the fixing device 8, is set to 450 mm/sec, and a regulated temperature of the halogen heater 306 is set to 190° C. In the separating performance evaluation test of the sheet, 20 sheets, on which an image stacking a maximum amount of the toner thereon is formed, are continuously passed through the nip portion N, and it is confirmed that there is no occurrence of conveyance defect, etc. A case, in which the conveyance defect does not occur, is defined as a case which achieves a goal. Conditions for a temperature and a humidity at a time of the measurement is set to 30° C. and 80%. For the base layer **301*a* of the belt 301** for the present verification, material is set as polyimide and the thickness is set to 95 μm. For the sheet, OK Top Coat+ of A4 size with a basis weight of 73 $g/m^2$ (Oji Paper Co., Ltd.) is used.

[Verification Result 1]

In FIG. 11, results of the belt durability evaluation test and the separating performance evaluation test of the sheet conducted for the Embodiment 1 and the Comparative Example 1 are shown. Incidentally, "○" of the determination in FIG. 11 indicates that the life exceeds 3000K (3000×1000) sheets, while "x" indicates that the life is less than 3000K (3000×1000) sheets. In addition, "○" of the paper separating performance evaluation test indicates that the conveyance failure does not occur.

As the results of the belt durability evaluation test, the durable number of sheets is 10 million sheets in the Embodiment 1 and is 3 million sheets in the Comparative Example 1. This difference can be attributed to a fact that the bending strain of the second portion **303*a*2 downstream of the A-np region in the Embodiment 1 is smaller than that in the Comparative Example 1. In addition, while the crack occurs at the end portion in the widthwise direction of the belt 301 in the Comparative Example 1, the crack occurs at a central portion in the widthwise direction of the belt 301 in the Embodiment 1. It can be presumed that since the bending strain at the end portion in the widthwise direction (A-np region) of the belt 301** is reduced in the Embodiment 1, the crack occurs in the central portion due to the strain being relatively increased at the central portion in the widthwise direction. In addition, in the separating performance evaluation test of the sheet, all satisfy the function and it is confirmed that, even in a case in which the shape of the second portion of the pad is changed, there is no effect on the separating performance of the recording material.

[Verification Result 2]

In FIG. 11, results of the belt durability evaluation test and the separating performance evaluation test of the sheet conducted for the Embodiment 2 and the Comparative Example 2 are shown. As the results of the belt durability evaluation test, the durable number of sheets is 8 million sheets in the Embodiment 2 and is 1.2 million sheets in the Comparative Example 2. This difference can be attributed to a fact that the bending strain of the second portion **303*b*2 downstream of the A-np region in the Embodiment 2 is smaller than that in the Comparative Example 2. In addition, while the crack occurs in the belt at the end portion in the widthwise direction (A-np region) of the belt 301 in the Comparative Example 2, the crack occurs at a central portion in the widthwise direction of the belt 301 in the Embodiment 2. It can be presumed that since the bending strain at the end portion in the widthwise direction (A-np region) of the belt 301** is reduced in the Embodiment 2, the crack occurs in the central portion due to the strain being relatively increased at the central portion in the widthwise direction. In addition, in the separating performance evaluation test of the sheet, all satisfy the function and it is confirmed that, even in a case in which the shape of the second portion of the pad is changed, there is no effect on the separating performance of the recording material.

As described above, it is found that, in the Embodiment 1 and the Embodiment 2, it becomes possible to suppress the shortening of the life of the belt 301 compared to the Comparative Example 1 and the Comparative Example 2 without degrading the separating performance of the sheet. In other words, according to the Embodiments 1 and 2, it becomes possible to suppress the shortening of the life of the belt 301 without degrading the separating performance of the recording material.

OTHER EMBODIMENTS

In each Embodiment described above, the respective pads 303 and 303A are constituted integrally, however, the pads 303 and 303A may be constituted by a plurality of members. For example, the pads 303 and 303A may be separated in two bodies.

In addition, in each Embodiment described above, the configuration of the pad 303 downstream in the conveyance direction of the nip portion N is described, however, to a configuration of the pad 303 upstream in the conveyance direction of the nip portion N, the same configuration as the downstream may be applied.

In addition, in each Embodiment described above, the configuration in which the tension is applied to the belt 301 by the steering roller 308 as a tension applying member is described, however, it may be a configuration in which, even without such a tension applying member, the pad and the roller is disposed so that the tension is applied to the belt. For example, to a configuration, in which the belt 301 is stretched only by the heating roller 307 and the pads 303 and 303A, the present invention can be applied.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-037541 filed on Mar. 11, 2024, which is hereby incorporated by reference herein in its entirety.

What is claimed is:

1. A fixing device for fixing a toner image carried on a recording material to the recording material, the fixing device comprising:

an endless and rotatable belt;

a rotating member configured to rotate in contact with an outer peripheral surface of the belt;

a pad member disposed inside the belt so as to nip the belt between itself and the rotating member and form a nip portion for nipping and conveying the recording material between the belt and the rotating member;

a sliding member disposed between the pad member and the belt, and configured to contact and slide together with an inner peripheral surface of the belt in the nip portion; and a heating roller disposed inside the belt and configured to heat the belt, wherein the pad member includes a curved portion which is curved so as to directly contact the belt in a downstream side of the nip portion with respect to a conveyance direction of the recording material and curves the belt so as to separate the recording material passed through the nip portion from the belt, and wherein the curved portion includes a first portion positioned in a downstream side, with respect to the conveyance direction, of a passing through region where a recording material with a maximum size passes through the nip portion and a second portion positioned in a downstream side, with respect to the conveyance direction, of a non-passing through region outside of the passing through region with respect to a widthwise direction, of the recording material, crossing the conveyance direction, and wherein a radius of curvature of the second portion is larger than a radius of curvature of the first portion.

2. The fixing device according to claim 1, wherein the curved portion is formed so that the radius of curvature is continuously increased from the first portion toward the second portion.

3. The fixing device according to claim 1, wherein the belt includes a base layer, and wherein when a thickness of the base layer is defined as t, the radius of curvature of the curved portion is defined as R and a bending strain expressed by a following formula is defined as E, $$E = \frac{t}{R} \times 100[\%],$$

a bending strain E of the second portion is smaller than a bending strain E of the first portion.

4. The fixing device according to claim 1, wherein the sliding member includes a plurality of projections provided on a side of sliding with the belt so as to project toward the inner peripheral surface of the belt, and wherein the plurality of projections are distributed in the widthwise direction.

5. The fixing device according to claim 4, wherein the plurality of projections are distributed in the passing through region and the non-passing through region with respect to the widthwise direction.

6. The fixing device according to claim 1, further comprising a tension applying member configured to apply a tension to the belt.

7. The fixing device according to claim 6, wherein the tension applying member is a steering roller provided inside the belt and configured to stretch the belt and control a position of the belt with respect to the widthwise direction.

8. A fixing device for fixing a toner image carried on a recording material to the recording material, the fixing device comprising:

an endless and rotatable belt;

a rotating member configured to rotate in contact with an outer peripheral surface of the belt;

a pad member disposed inside the belt so as to nip the belt between itself and the rotating member and form a nip portion for nipping and conveying the recording material between the belt and the rotating member; and a sliding member disposed between the pad member and the belt, and configured to contact and slide together with an inner peripheral surface of the belt in the nip portion; and a heating roller disposed inside the belt and configured to heat the belt, wherein the pad member includes a curved portion which is curved so as to directly contact the belt in a downstream side of the nip portion with respect to a conveyance direction of the recording material and curves the belt so as to separate the recording material passed through the nip portion from the belt, wherein the curved portion includes a first portion positioned in a downstream side, with respect to the conveyance direction, of a passing through region where a recording material with a maximum size passes through the nip portion and a second portion positioned in a downstream side, with respect to the conveyance direction, of a non-passing through region outside on the passing through region with respect to a widthwise direction, of the recording material, crossing the conveyance direction, wherein the pad member includes a contact portion which is provided in a downstream side of the nip portion with respect to a conveyance direction of the recording material so as to be discontinuous to a downstream end of the nip portion, and wherein when a direction perpendicular to each of the conveyance direction and the widthwise direction is defined as a pressing direction in which the recording material is pressed by the nip portion and a distance from a downstream end of the nip portion to the contact portion is defined as a distance in the pressing direction, a distance of the second portion in the pressing direction is shorter than a distance of the first portion in the pressing direction.

9. A fixing device for fixing a toner image carried on a recording material to the recording material, the fixing device comprising:

an endless and rotatable belt;

a rotating member configured to rotate in contact with an outer peripheral surface of the belt;

a pad member disposed inside the belt so as to nip the belt between itself and the rotating member and form a nip portion for nipping and conveying the recording material between the belt and the rotating member; and a sliding member disposed between the pad member and the belt, and configured to contact and slide together with an inner peripheral surface of the belt in the nip portion; and a heating roller disposed inside the belt and configured to heat the belt, wherein the pad member includes a contact portion which is provided in a downstream side of the nip portion with respect to a conveyance direction of the recording material so as to be discontinuous to a downstream end of the nip portion, and brings the sliding member into contact with belt or directly contacts the belt, wherein a separation portion which curves the belt so as to separate the recording material passed through the nip portion from the belt is constituted by the downstream end of the nip portion and the contact portion, wherein the separation portion includes a first portion positioned in a downstream side, with respect to the conveyance direction, of a passing through region where a recording material with a maximum size passes through the nip portion and a second portion positioned in a downstream side, with respect to the conveyance direction, of a non-passing through region outside on the passing through region with respect to a widthwise direction, of the recording material, crossing the conveyance direction, and wherein when a direction perpendicular to each of the conveyance direction and the widthwise direction is defined as a pressing direction in which the recording material is pressed by the nip portion and a distance from a downstream end of the nip portion to the contact portion is defined as a distance in the pressing direction, a distance of the second portion in the pressing direction is shorter than a distance of the first portion in the pressing direction.

10. The fixing device according to claim 9, wherein when a distance from a downstream end of the nip portion to the contact portion with respect to the conveyance direction is defined as a distance in the conveyance direction, a distance of the second portion in the conveyance direction is same as a distance of the first portion in the conveyance direction.

11. The fixing device according to claim 9, wherein the separation portion is formed such that the distance in the pressing direction is continuously shortened from the first portion toward the second portion.

12. The fixing device according to claim 9, wherein the belt includes a base layer, and wherein when a thickness of the base layer is defined as t, the distance in the pressing direction is defined as ΔZ, a distance in the conveyance direction from a downstream end of the nip portion to the contact portion with respect to the conveyance direction is defined as ΔX, and a bending strain expressed by a following formula is defined as E, $$E = t \times \frac{\Delta X}{\Delta Z\sqrt{\Delta X^2 + \Delta Z^2}} \times 100[\%]$$

a bending strain E of the second portion is smaller than a bending strain E of the first portion.

13. The fixing device according to claim 12, wherein the sliding member includes a plurality of projections provided on a side of sliding with the belt so as to project toward the inner peripheral surface of the belt, and wherein, of the plurality of projections, the downstream end of the nip portion is a downstream end of the projection that is further downstream with respect to the conveyance direction.

14. The fixing device according to claim 9, wherein the sliding member includes a plurality of projections provided on a side of sliding with the belt so as to project toward the inner peripheral surface of the belt, and wherein the plurality of projections are distributed in the widthwise direction.

15. The fixing device according to claim 14, wherein the plurality of projections are distributed in the passing through region and the non-passing through region with respect to the widthwise direction.

16. The fixing device according to claim 14, wherein the sliding member includes a sliding layer configured to cover a surface, on a side of sliding with the belt, including the plurality of projections, and the distance in the pressing direction is a distance from the sliding layer which covers the projections positioned in the downstream end of the nip portion to the contact portion.

17. The fixing device according to claim 14, wherein the sliding member includes a sliding layer configured to cover a surface, on a side of sliding with the belt, including the plurality of projections, and the distance in the pressing direction is a distance from the projections positioned in the downstream end of the nip portion to the contact portion.

* * * * *